(12) United States Patent
Fife et al.

(10) Patent No.: US 10,985,610 B2
(45) Date of Patent: Apr. 20, 2021

(54) HIGH SPEED CONTROL SYSTEMS AND METHODS FOR ECONOMICAL OPTIMIZATION OF AN ELECTRICAL SYSTEM

(71) Applicant: Enel X North America, Inc., Boston, MA (US)

(72) Inventors: John Michael Fife, Bend, OR (US); Rebecca G. Wolkoff, Shaker Heights, OH (US)

(73) Assignee: Enel X North America, Inc., Boston, MA (US)

( * ) Notice: Subject to any disclaimer, the term of this patent is extended or adjusted under 35 U.S.C. 154(b) by 0 days.

(21) Appl. No.: 16/719,235

(22) Filed: Dec. 18, 2019

(65) Prior Publication Data

US 2020/0169116 A1 May 28, 2020

Related U.S. Application Data

(63) Continuation-in-part of application No. 15/414,552, filed on Jan. 24, 2017, now Pat. No. 10,592,833.

(60) Provisional application No. 62/328,476, filed on Apr. 27, 2016, provisional application No. 62/317,372, filed on Apr. 1, 2016.

(51) Int. Cl.
| | |
|---|---|
| *H02J 13/00* | (2006.01) |
| *G05B 13/02* | (2006.01) |
| *G06Q 50/06* | (2012.01) |
| *H02J 3/38* | (2006.01) |
| *H02J 3/28* | (2006.01) |

(52) U.S. Cl.
CPC ...... *H02J 13/00006* (2020.01); *G05B 13/024* (2013.01); *G06Q 50/06* (2013.01); *H02J 3/28* (2013.01); *H02J 3/381* (2013.01); *H02J 13/00002* (2020.01); *G05B 13/0265* (2013.01); *H02J 2203/20* (2020.01); *H02J 2300/24* (2020.01)

(58) Field of Classification Search
None
See application file for complete search history.

(56) References Cited

U.S. PATENT DOCUMENTS

| | | |
|---|---|---|
| 4,475,685 A | 10/1984 | Grimado et al. |
| 5,644,173 A | 7/1997 | Elliason et al. |
| 5,873,251 A | 2/1999 | Iino |
| 7,797,062 B2 | 9/2010 | Discenzo et al. |

(Continued)

OTHER PUBLICATIONS

Fife, Office Action dated Sep. 2, 2020 for U.S. Appl. No. 16/517,428.

(Continued)

*Primary Examiner* — Carlos R Ortiz Rodriguez
(74) *Attorney, Agent, or Firm* — Stoel Rives LLP; R. Whitney Johnson; Andrew C. Wasden

(57) ABSTRACT

The present disclosure is directed to systems and methods for economically optimal control of an electrical system. A two-stage controller includes an optimizer and a high speed controller to effectuate a change to one or more components of the electrical system. The high speed controller receives a set of control parameters for an upcoming extended time period. The control parameters include a plurality of bounds for an adjusted net power of the electrical system. The high speed controller sets an energy storage system command control variable (ESS command) based on a state of adjusted net power of the electrical system and the set of control parameters.

20 Claims, 17 Drawing Sheets

(56) References Cited

U.S. PATENT DOCUMENTS

| | | |
|---|---|---|
| 8,019,445 B2 | 9/2011 | Marhoefer |
| 8,600,571 B2 | 12/2013 | Dillon et al. |
| 8,886,361 B1 | 11/2014 | Harmon et al. |
| 9,020,800 B2 | 4/2015 | Shelton et al. |
| 9,436,179 B1 | 9/2016 | Turney et al. |
| 9,865,024 B2 | 1/2018 | Mokhtari et al. |
| 10,395,196 B2 | 8/2019 | Fife |
| 2005/0065674 A1 | 3/2005 | Houpt et al. |
| 2006/0276938 A1 | 12/2006 | Miller |
| 2008/0058997 A1 | 3/2008 | Timblin |
| 2009/0048716 A1 | 2/2009 | Marhoefer |
| 2009/0319090 A1 | 12/2009 | Dillon et al. |
| 2010/0174643 A1 | 7/2010 | Schaefer et al. |
| 2010/0179704 A1 | 7/2010 | Ozog |
| 2010/0198421 A1 | 8/2010 | Fahimi et al. |
| 2011/0071695 A1 | 3/2011 | Kouroussis et al. |
| 2011/0106328 A1 | 5/2011 | Zhou et al. |
| 2011/0231320 A1 | 9/2011 | Irving |
| 2012/0296482 A1 | 11/2012 | Steven et al. |
| 2012/0302092 A1 | 11/2012 | Kaps et al. |
| 2012/0319642 A1 | 12/2012 | Suyama et al. |
| 2012/0323389 A1 | 12/2012 | Shelton et al. |
| 2013/0013121 A1 | 1/2013 | Henze et al. |
| 2013/0030590 A1 | 1/2013 | Prosser |
| 2013/0079939 A1 | 3/2013 | Darden, II et al. |
| 2013/0166081 A1 | 6/2013 | Sanders et al. |
| 2013/0166084 A1 | 6/2013 | Sedighy et al. |
| 2013/0166234 A1 | 6/2013 | Chou et al. |
| 2013/0226358 A1 | 8/2013 | Rudkevich et al. |
| 2013/0226637 A1 | 8/2013 | Bozchalui et al. |
| 2013/0261817 A1 | 10/2013 | Detmers et al. |
| 2013/0261823 A1 | 10/2013 | Krok et al. |
| 2013/0274935 A1 | 10/2013 | Deshpande et al. |
| 2013/0346139 A1 | 12/2013 | Steven et al. |
| 2014/0018971 A1 | 1/2014 | Ellis et al. |
| 2014/0039965 A1 | 2/2014 | Steven et al. |
| 2014/0058572 A1 | 2/2014 | Stein et al. |
| 2014/0167705 A1 | 6/2014 | Chang et al. |
| 2014/0236369 A1 | 8/2014 | Kearns et al. |
| 2014/0266054 A1 | 9/2014 | Faries et al. |
| 2014/0277797 A1 | 9/2014 | Mokhtari et al. |
| 2014/0350743 A1 | 11/2014 | Asghari et al. |
| 2014/0365022 A1 | 12/2014 | Ghosh et al. |
| 2015/0127425 A1 | 5/2015 | Greene et al. |
| 2015/0268307 A1 | 9/2015 | Inguva et al. |
| 2015/0355655 A1 | 12/2015 | Wang et al. |
| 2016/0011274 A1 | 1/2016 | Morita et al. |
| 2016/0041575 A1 | 2/2016 | Tadano |
| 2016/0047862 A1 | 2/2016 | Shimizu et al. |
| 2016/0377686 A1 | 12/2016 | Uchida et al. |
| 2017/0099056 A1 | 4/2017 | Vickery et al. |
| 2017/0103483 A1 | 4/2017 | Drees et al. |
| 2017/0285111 A1 | 10/2017 | Fife |
| 2017/0285587 A1 | 10/2017 | Fife |
| 2017/0285678 A1 | 10/2017 | Fife |
| 2017/0286882 A1 | 10/2017 | Fife |
| 2019/0042992 A1 | 2/2019 | Fife |
| 2019/0340555 A1 | 11/2019 | Fife |

OTHER PUBLICATIONS

Lee, et al., "Optimized Control Strategy for Hybrid Energy System", Jun. 2015, 9th International Conference on Power Electronics-ECCE Asia, p. 2496-2500 IEEE Transactions on Industrial Informatics, vol. 7, No (Year: 2015).

Palensky, et al., "Demand Side Management: Demand Response, Intelligent Energy Systems, and Smart Loads", Aug. 2011, IEEE Transactions on Industrial Informatics, vol. 7, No. 3, p. 381-388 (Year: 2011).

Corrected Notice of Allowability dated Jun. 28, 2018 in U.S. Appl. No. 15/414,546.

International Search Report and Written Opinion dated Jul. 11, 2017 for PCT/US2017/024948.

Notice of Allowance dated Aug. 31, 2018 in U.S. Appl. No. 15/414,546.

Notice of Allowance dated Jun. 6, 2018 in U.S. Appl. No. 15/414,546.

Fife, Advisory Action dated Jul. 20, 2018 for U.S. Appl. No. 15/414,543.

Fife, Notice of Allowance dated Apr. 10, 2019 for U.S. Appl. No. 15/414,551.

Fife, Notice of Allowance dated Jan. 8, 2020 for U.S. Appl. No. 15/414,552.

Fife, Notice of Allowance dated Jul. 3, 2019 for U.S. Appl. No. 16/154,124.

Fife, Office Action dated Apr. 30, 2018 for U.S. Appl. No. 15/414,543.
Fife, Office Action dated Apr. 4, 2019 for U.S. Appl. No. 15/414,552.
Fife, Office Action dated Apr. 9, 2019 for U.S. Appl. No. 15/414,543.
Fife, Office Action dated Dec. 21, 2018 for U.S. Appl. No. 15/414,543.
Fife, Office Action dated Dec. 29, 2017 for U.S. Appl. No. 15/414,543.
Fife, Office Action dated Jun. 27, 2019 for U.S. Appl. No. 15/414,552.
Fife, Office Action dated May 3, 2018 for U.S. Appl. No. 15/414,552.
Fife, Office Action dated Oct. 12, 2018 for U.S. Appl. No. 15/414,552.
Fife, Office Action dated Oct. 25, 2018 for U.S. Appl. No. 15/414,551.
Fife, Office Action dated Dec. 28, 2018 for U.S. Appl. No. 16/154,124., 20 pages.

b) Control Diagram

HIGH SPEED CONTROL SYSTEMS AND METHODS FOR ECONOMICAL OPTIMIZATION OF AN ELECTRICAL SYSTEM

RELATED APPLICATIONS

This application is a continuation in part of U.S. patent application Ser. No. 15/414,552, filed Jan. 24, 2017, titled "Extended Control In Control Systems And Methods For Economical Optimization Of An Electrical System," which claims priority to U.S. Provisional Patent Application No. 62/317,372, titled "Economically Optimal Control of Electrical Systems," filed Apr. 1, 2016, and priority to U.S. Provisional Patent Application No. 62/328,476, titled "Demand Charge Reduction using Simulation-Based Demand Setpoint Determination," filed Apr. 27, 2016. The subject matter of each of the foregoing applications is hereby incorporated herein by reference to the extent such subject matter is not inconsistent herewith.

TECHNICAL FIELD

The present disclosure is directed to systems and methods for control of an electrical system, and more particularly to controllers and methods of controllers for controlling an electrical system.

BACKGROUND

Electricity supply and delivery costs continue to rise, especially in remote or congested areas. Moreover, load centers (e.g., population centers where electricity is consumed) increasingly demand more electricity. In the U.S. energy infrastructure is such that power is mostly produced by resources inland, and consumption of power is increasing at load centers along the coasts. Thus, transmission and distribution (T&D) systems are needed to move the power from where it's generated to where it's consumed at the load centers. As the load centers demand more electricity, additional T&D systems are needed, particularly to satisfy peak demand. However, a major reason construction of additional T&D systems is unwise and/or undesirable is because full utilization of this infrastructure is really only necessary during relatively few peak demand periods, and would otherwise be unutilized or underutilized. Justifying the significant costs of constructing additional T&D resources may make little sense when actual utilization may be relatively infrequent.

Distributed energy storage is increasingly seen as a viable means for minimizing rising costs by storing electricity at the load centers for use during the peak demand times. An energy storage system (ESS) can enable a consumer of energy to reduce or otherwise control a net consumption from an energy supplier. For example, if electricity supply and/or delivery costs are high at a particular time of day, an ESS, which may include one or more batteries or other storage devices, can generate/discharge electrical energy at that time when costs are high in order to reduce the net consumption from the supplier. Likewise, when electricity rates are low, the ESS may charge so as to have reserve energy to be utilized in a later scenario as above when supply and/or delivery costs are high.

Presently available automatic controllers of electrical systems utilize rule sets and iteration to find an operating command that in its simplest form can be a single scalar value that specifies the charge (or discharge) power setting of a battery. The main drawbacks of this existing approach are that it doesn't necessarily provide economically optimal control considering all costs and benefits, rule sets become complex quickly, even for just two value streams (which makes the algorithm difficult to build and maintain), and this approach is not easily scalable to new rate tariffs or other markets or value streams (rule sets must be rewritten).

An economically optimizing automatic controller may be beneficial and may be desirable to enable intelligent actions to be taken to more effectively utilize controllable components of an electrical system, and without the aforementioned drawbacks.

BRIEF DESCRIPTION OF THE DRAWINGS

Additional aspects and advantages will be apparent from the following detailed description of preferred embodiments, which proceeds with reference to the accompanying drawings, in which.

DETAILED DESCRIPTION

As electricity supply and delivery costs increase, especially in remote or congested areas, distributed energy storage is increasingly seen as a viable means for reducing those costs. The reasons are numerous, but primarily an energy storage system (ESS) gives a local generator or consumer the ability to control net consumption and delivery of electrical energy at a point of interconnection, such as a building's service entrance in example implementations where an ESS is utilized in an apartment building or office building. For example, if electricity supply and/or delivery costs (e.g., charges) are high at a particular time of day, an ESS can generate/discharge electrical energy from a storage system at that time to reduce the net consumption of a consumer (e.g., a building), and thus reduce costs to the consumer. Likewise, when electricity rates are low, the ESS may charge its storage system which may include one or more batteries or other storage devices; the lower-cost energy stored in the ESS can then be used to reduce net consumption and thus costs to the consumer at times when the supply and/or delivery costs are high. There are many ways an ESS can provide value.

Figure 16:
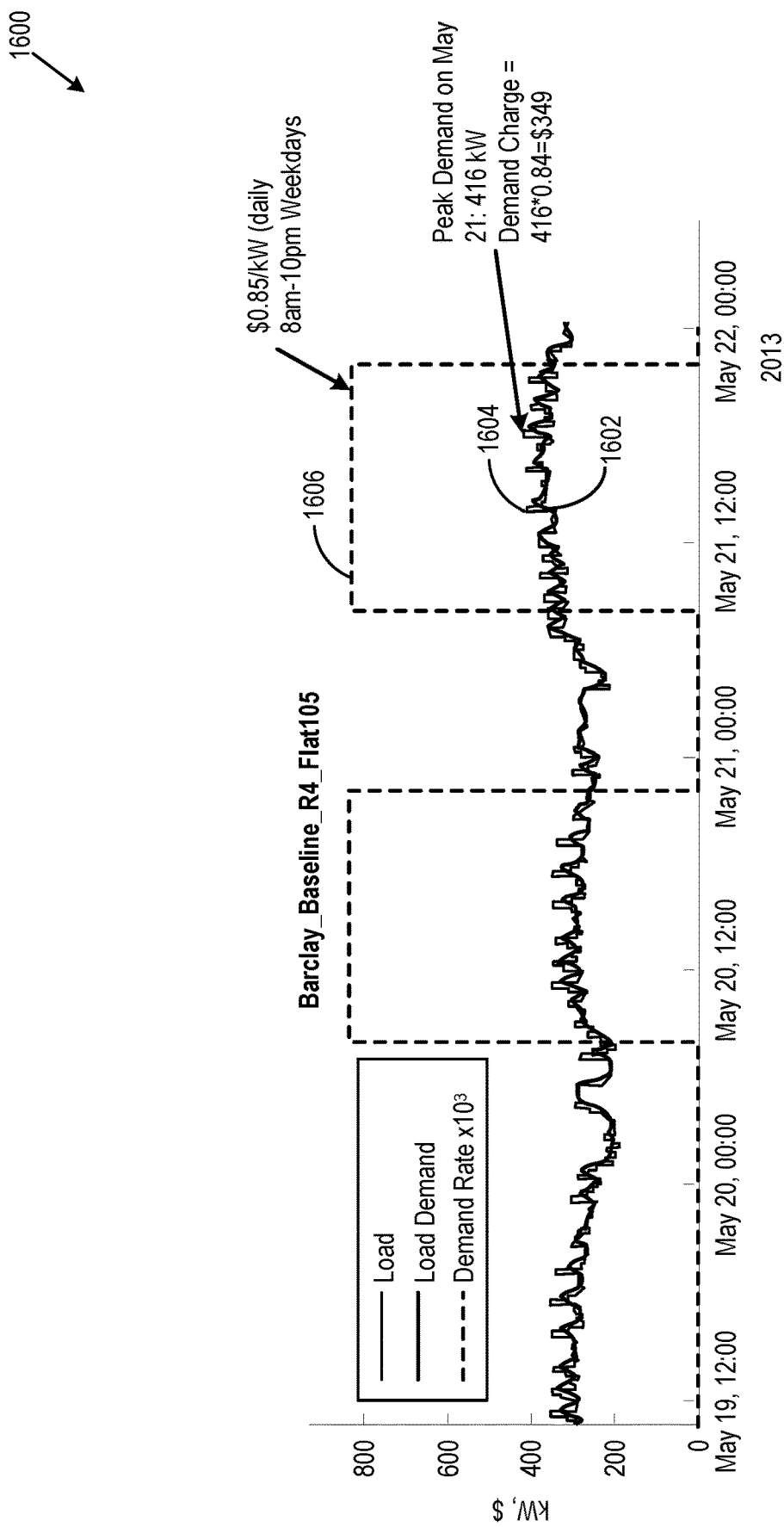
FIG. 16 is a graph illustrating how demand charges impact energy costs of a customer.

One possible way in which ESSs can provide value (e.g., one or more value streams) is by reducing time-of-use (ToU) supply charges. ToU supply charges are typically pre-defined in a utility's tariff document by one or more supply rates and associated time windows. ToU supply charges may be calculated as the supply rate multiplied by the total energy consumed during the time window. ToU supply rates in the United States may be expressed in dollars per kilowatt-hour ($/kWh). The ToU supply rates and time windows may change from time to time, for example seasonally, monthly, daily, or hourly. Also, multiple ToU supply rates and associated time windows may exist and may overlap. ToU supply rates are time-varying which makes them different from "flat" supply rates that are constant regardless of time of use. An example of ToU charges and the impact on customer energy costs is illustrated in FIG. 16 and described more fully below with reference to the same. An automatic controller may be beneficial and may be desirable to enable intelligent actions to be taken as frequently as may be needed to utilize an ESS to reduce ToU supply charges.

Another possible way in which ESSs can provide value is by reducing demand charges. Demand charges are electric utility charges that are based on the rate of electrical energy consumption (also called "demand") during particular time windows (which we will call "demand windows"). A precise definition of demand and the formula for demand charges may be defined in a utility's tariff document. For example, a tariff may specify that demand be calculated at given demand intervals (e.g., 15-minute intervals, 30-minute intervals, 40-minute intervals, 60-minute intervals, 120-minute intervals, etc.). The tariff may also define demand as being the average rate of electrical energy consumption over a previous period of time (e.g., the previous 15 minutes, 30 minutes, 40 minutes, etc.). The previous period of time may or may not coincide with the demand interval. Demand may be expressed in units of power such as kilowatts (kW) or megawatts (MW). The tariff may describe one or more demand rates, each with an associated demand window (e.g., a period of time during which a demand rate applies). The demand windows may be contiguous or noncontiguous and may span days, months, or any other total time interval per the tariff. Also, one or more demand window may overlap which means that, at a given time, more than one demand rate may be applicable. Demand charges for each demand window may be calculated as a demand rate multiplied by the maximum demand during the associated demand window. Demand rates in the United States may be expressed in dollars per peak demand ($/kW). An example of demand charges is shown in FIG. 16 and described more fully below with reference to the same. As can be appreciated, demand tariffs may change from time to time, or otherwise vary, for example annually, seasonally, monthly, or daily. An automatic controller may be beneficial and may be desirable to enable intelligent actions to be taken as frequently as may be needed to utilize an ESS to reduce demand charges.

Another possible way in which ESSs can provide value is through improving utilization of local generation by: (a) maximizing self-consumption of renewable energy, or (b) reducing fluctuations of a renewable generator such as during cloud passage on solar photovoltaic (PV) arrays. An automatic controller may be beneficial and may be desirable to enable intelligent actions to be taken to effectively and more efficiently utilize locally generated power with an ESS.

Another possible way in which ESSs can provide value is through leveraging local contracted or incentive maneuvers. For example New York presently has available a Demand Management Program (DMP) and a Demand Response Program (DRP). These programs, and similar programs, offer benefits (e.g., a statement credit) or other incentives for consumers to cooperate with the local utility(ies). An automatic controller may be beneficial and may be desirable to enable intelligent actions to be taken to utilize an ESS to effectively leverage these contracted or incentive maneuvers.

Still another possible way in which ESSs can provide value is through providing reserve battery capacity for backup power in case of loss of supply. An automatic controller may be beneficial and may be desirable to enable intelligent actions to be taken to build and maintain such reserve battery backup power with an ESS.

As can be appreciated, an automatic controller that can automatically operate an electrical system to take advantage of any one or more of these value streams using an ESS may be desirable and beneficial.

Controlling Electrical Systems

An electrical system, according to some embodiments, may include one or more electrical loads, generators, and ESSs. An electrical system may include all three of these components (loads, generators, ESSs), or may have varying numbers and combinations of these components. For example, an electrical system may have loads and an ESS, but no local generators (e.g., photovoltaic, wind). The electrical system may or may not be connected to an electrical utility distribution system (or "grid"). If not connected to an electrical utility distribution system, it may be termed "off-grid."

An ESS of an electrical system may include one or more storage devices and any number of power conversion devices. The power conversion devices are able to transfer energy between an energy storage device and the main electrical power connections that in turn connect to the electrical system loads and, in some embodiments, to the grid. The energy storage devices may be different in different implementations of the ESS. A battery is a familiar example of a chemical energy storage device. For example, in one embodiment of the present disclosure, one or more electric vehicle batteries is connected to an electrical system and can be used to store energy for later use by the electrical system. A flywheel is an example of a mechanical energy storage device.

Figure 1:
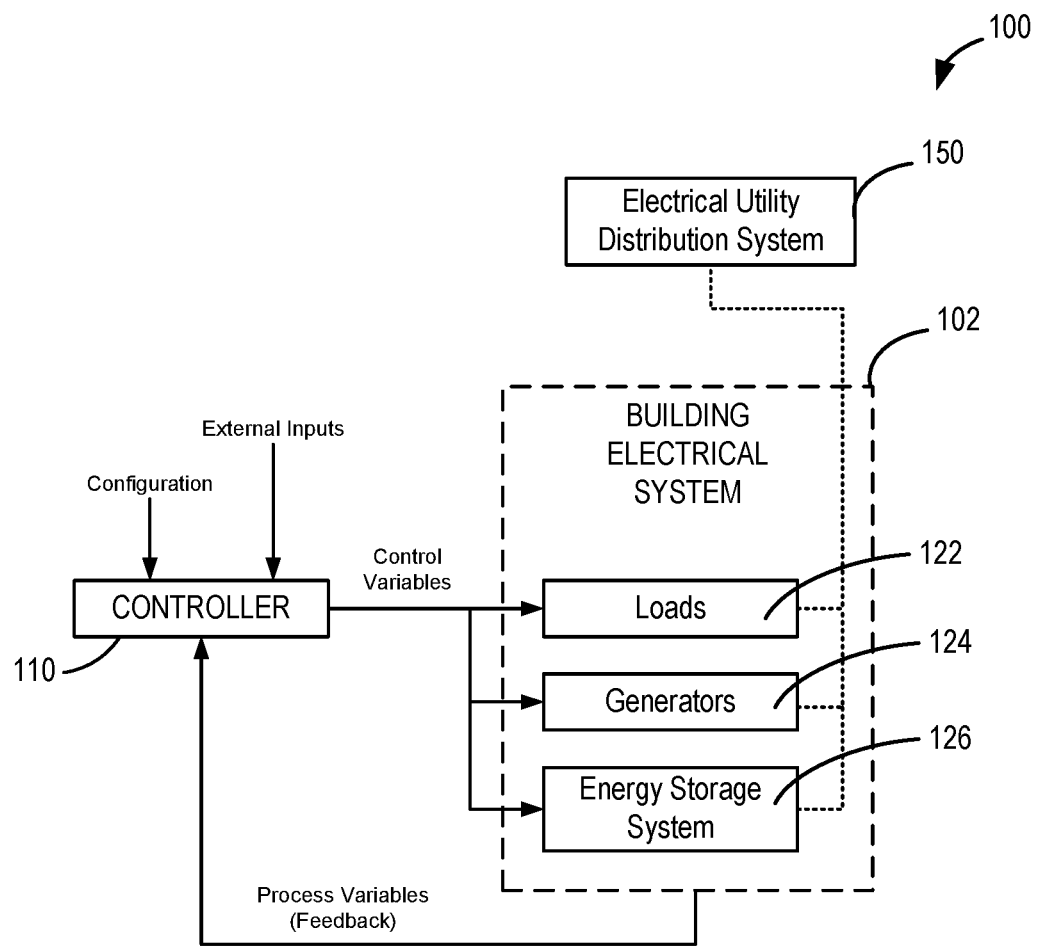
FIG. 1 is a block diagram illustrating a system architecture of a controllable electrical system, according to one embodiment of the present disclosure.

FIG. 1 is a control diagram of an electrical system 100, according to one embodiment of the present disclosure. Stated otherwise, FIG. 1 is a representative diagram of a system architecture of an electrical system 100 including a controller 110, according to one embodiment. The electrical system 100 comprises a building electrical system 102 that is controlled by the controller 110. The building electrical system 102 includes one or more loads 122, one or more generators 124, and an energy storage system (ESS) 126. The building electrical system 102 is coupled to an electrical utility distribution system 150, and therefore may be considered on-grid. Similar electrical systems exist for other applications such as a photovoltaic generator plant and an off-grid building.

In the control diagram of FIG. 1, the controller 110 is shown on the left-hand side and the building electrical system 102, sometimes called the "plant," is on the right-hand side. The controller 110 may include electronic hardware and software in one embodiment. In one example arrangement, the controller 110 includes one or more processors and suitable storage media, which stores programming in the form of executable instructions which are executed by the processors to implement the control processes. In some embodiments, the building electrical system 102 is the combination of all local loads 122, local generators 124, and the ESS 126.

Loads are consumers of electrical energy within an electrical system. Examples of loads are air conditioning systems, motors, electric heaters, etc. The sum of the loads' electricity consumption rates can be measured in units of power (e.g. kW) and simply called "load" (e.g., a building load).

Generators may be devices, apparatuses, or other means for generating electrical energy within an electrical system. Examples are solar photovoltaic systems, wind generators, combined heat and power (CHP) systems, and diesel generators or "gen-sets." The sum of electric energy generation rates of the generators 124 can be measured in units of power (e.g., kW) and simply referred to as "generation."

As can be appreciated, loads may also generate at certain times. An example may be an elevator system that is capable of regenerative operation when the carriage travels down.

Unadjusted net power may refer herein to load minus generation in the absence of active control by a controller described herein. For example, if at a given moment a building has loads consuming 100 kW, and a solar photovoltaic system generating at 25 kW, the unadjusted net power is 75 kW. Similarly, if at a given moment a building has loads consuming 70 kW, and a solar photovoltaic system generating at 100 kW, the unadjusted net power is −30 kW. As a result, the unadjusted net power is positive when the load energy consumption exceeds generation, and negative when the generation exceeds the load energy consumption.

ESS power refers herein to a sum of a rate of electric energy consumption of an ESS. If ESS power is positive, an ESS is charging (consuming energy). If ESS power is negative, an ESS is generating (delivering energy).

Adjusted net power refers herein to unadjusted net power plus the power contribution of any controllable elements such as an ESS. Adjusted net power is therefore the net rate of consumption of electrical energy of the electrical system considering all loads, generators, and ESSs in the system, as controlled by a controller described herein.

Unadjusted demand is demand defined by the locally applicable tariff, but only based on the unadjusted net power. In other words, unadjusted demand does not consider the contribution of any ESS.

Adjusted demand or simply "demand" is demand as defined by the locally applicable tariff, based on the adjusted net power, which includes the contribution from any and all controllable elements such as ESSs. Adjusted demand is the demand that can be monitored by the utility and used in the demand charge calculation.

Referring again to FIG. 1, the building electrical system 102 may provide information to the controller 110, such as in a form of providing process variables. The process variables may provide information, or feedback, as to a status of the building electrical system 102 and/or one or more components (e.g., loads, generators, ESSs) therein. For example, the process variable may provide one or more measurements of a state of the electrical system. The controller 110 receives the process variables for determining values for control variables to be communicated to the building electrical system 102 to effectuate a change to the building electrical system 102 toward meeting a controller objective for the building electrical system 102. For example, the controller 110 may provide a control variable to adjust the load 122, to increase or decrease generation by the generator 124, and to utilize (e.g., charge or discharge) the ESS 126. The controller 110 may also receive a configuration (e.g., a set of configuration elements), which may specify one or more constraints of the electrical system 102. The controller 110 may also receive external inputs (e.g., weather reports, changing tariffs, fuel costs, event data), which may inform the determination of the values of the control variables. A set of external inputs may be received by the controller 110. The set of external inputs may provide indication of one or more conditions that are external to the controller and the electrical system.

As noted, the controller 110 may attempt to meet certain objectives by changing a value associated with one or more control variables, if necessary. The objectives may be predefined, and may also be dependent on time, on any external inputs, on any process variables that are obtained from the building electrical system 102, and/or on the control variables themselves. Some examples of controller objectives for different applications are:

Minimize demand (kW) over a prescribed time interval;
  Minimize demand charges ($) over a prescribed time interval;
  Minimize total electricity charges ($) from the grid;
  Reduce demand (kW) from the grid by a prescribed amount during a prescribed time window; and
  Maximize the life of the energy storage device.

Objectives can also be compound—that is, a controller objective can be comprised of multiple individual objectives. One example of a compound objective is to minimize demand charges while maximizing the life of the energy storage device. Other compound objectives including different combinations of the individual objectives are possible.

The inputs that the controller 110 may use to determine (or otherwise inform a determination of) the control variables can include configuration, external inputs, and process variables.

Process variables are typically measurements of the electrical system state and are used by the controller 110 to, among other things, determine how well its objectives are being met. These process variables may be read and used by the controller 110 to generate new control variable values. The rate at which process variables are read and used by the controller 110 depends upon the application but typically ranges from once per millisecond to once per hour. For battery energy storage system applications, the rate is often between 10 times per second and once per 15 minutes. Examples of process variables may include:
- Unadjusted net power
- Unadjusted demand
- Adjusted net power
- Demand
- Load (e.g., load energy consumption for one or more loads)
- Generation for one or more loads
- Actual ESS charge or generation rate for one or more ESS
- Frequency
- Energy storage device state of charge (SoC) (%) for one or more ESS
- Energy storage device temperature (deg. C.) for one or more ESS
- Electrical meter outputs such as kilowatt-hours (kWh) or demand.

A configuration received by the controller 110 (or input to the controller 110) may include or be received as one or more configuration elements (e.g., a set of configuration elements). The configuration elements may specify one or more constraints associated with operation of the electrical system. The configuration elements may define one or more cost elements associated with operation of the electrical system 102. Each configuration element may set a status, state, constant or other aspect of the operation of the electrical system 102. The configuration elements may be values that are typically constant during the operation of the controller 110 and the electrical system 102 at a particular location. The configuration elements may specify one or more constraints of the electrical system and/or specify one or more cost elements associated with operation of the electrical system.

Examples of configuration elements may include:
- ESS type (for example if a battery: chemistry, manufacturer, and cell model)
- ESS configuration (for example, if a battery: number of cells in series and parallel) and constraints (such as maximum charge and discharge powers)
- ESS efficiency properties
- ESS degradation properties (as a function of SoC, discharge or charge rate, and time)
- Electricity supply tariff (including ToU supply rates and associated time windows)
- Electricity demand tariff (including demand rates and associated time windows)
- Electrical system constraints such as minimum power import
- ESS constraints such as SoC limits or power limits
- Historic data such as unadjusted net power or unadjusted demand, weather data, and occupancy
- Operational constraints such as a requirement for an ESS to have a specified minimum amount of energy at a specified time of day.

External inputs are variables that may be used by the controller 110 and that may change during operation of the controller 110. Examples are weather forecasts (e.g., irradiance for solar generation and wind speeds for wind generation) and event data (e.g., occupancy predictions). In some embodiments, tariffs (e.g., demand rates defined therein) may change during the operation of the controller 110, and may therefore be treated as an external input.

The outputs of the controller 110 are the control variables that can affect the electrical system behavior. Examples of control variables are:
- ESS power command (kW or %). For example, an ESS power command of 50 kW would command the ESS to charge at a rate of 50 kW, and an ESS power command of −20 kW would command the ESS to discharge at a rate of 20 kW.
- Building or subsystem net power increase or reduction (kW or %)
- Renewable energy increase or curtailment (kW or %). For example a photovoltaic (PV) system curtailment command of −100 kW would command a PV system to limit generation to no less than −100 kW. Again, the negative sign is indicative of the fact that the value is generative (non-consumptive). In some embodiments, control variables that represent power levels may be signed, e.g., positive for consumptive or negative for generative.

In one illustrative example, consider that an objective of the controller 110 may be to reduce demand charges while preserving battery life. In this example, only the ESS may be controlled. To accomplish this objective, the controller should have knowledge of a configuration of the electrical system 102, such as the demand rates and associated time windows, the battery capacity, the battery type and arrangement, etc. Other external inputs may also be used to help the controller 110 meet its objectives, such as a forecast of upcoming load and/or forecast of upcoming weather (e.g., temperature, expected solar irradiance, wind). Process variables from the electrical system 102 that may be used may provide information concerning a net electrical system power or energy consumption, demand, a battery SoC, an unadjusted building load, and an actual battery charge or discharge power. In this one illustrative example, the control variable may be a commanded battery ESS's charge or discharge power. In order to more effectively meet the objective, the controller 110 may continuously track the peak net building demand (kW) over each applicable time window, and use the battery to charge or generate at appropriate times to limit the demand charges. In one specific example scenario, the ESS may be utilized to attempt to achieve substantially flat (or constant) demand from the electrical utility distribution system 150 (e.g., the grid) during an applicable time window when a demand charge applies.

Figure 2:
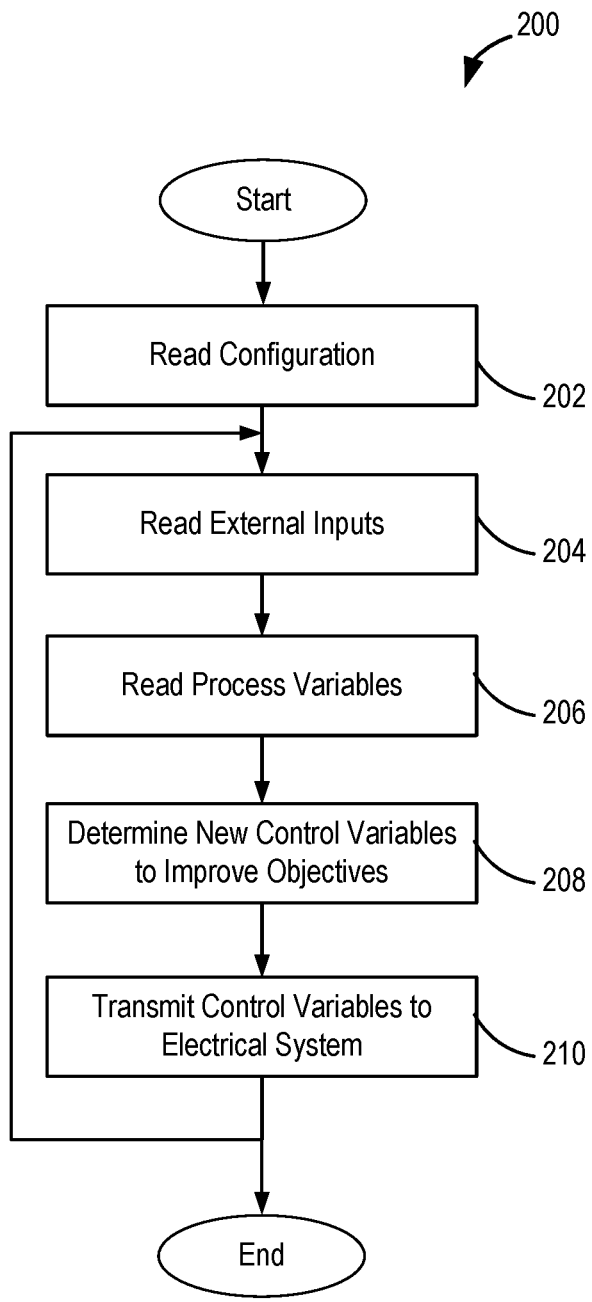
FIG. 2 is a flow diagram of a method or process of controlling an electrical system, according to one embodiment of the present disclosure.

FIG. 2 is a flow diagram of a method 200 or process of controlling an electrical system, according to one embodiment of the present disclosure. The method 200 may be implemented by a controller of an electrical system, such as the controller 110 of FIG. 1 controlling the building electrical system 102 of FIG. 1. The controller may read 202 or otherwise receive a configuration (e.g., a set of configuration elements) of the electrical system.

The controller may also read 204 or otherwise receive external inputs, such as weather reports (e.g., temperature, solar irradiance, wind speed), changing tariffs, event data (e.g., occupancy prediction, sizeable gathering of people at a location or venue), and the like.

The controller may also read 206 or otherwise receive process variables, which may be measurements of a state of the electrical system and indicate, among other things, how well objectives of the controller are being met. The process variables provide feedback to the controller as part of a feedback loop.

Using the configuration, the external inputs, and/or the process variables, the controller determines 208 new control variables to improve achievement of objectives of the controller. Stated differently, the controller determines 208 new values for each control variable to effectuate a change to the electrical system toward meeting one or more controller objectives for the electrical system. Once determined, the control variables (or values thereof) are transmitted 130 to the electrical system or components of the electrical system. The transmission 130 of the control variables to the electrical system allows the electrical system to process the control variables to determine how to adjust and change state, which thereby can effectuate the objective(s) of the controller for the electrical system.

Optimization

In some embodiments, the controller uses an algorithm (e.g., an optimization algorithm) to determine the control variables, for example, to improve performance of the electrical system. Optimization can be a process of finding a variable or variables at which a function f(x) is minimized or maximized. An optimization may be made with reference to such global extrema (e.g., global maximums and/or minimums), or even local extrema (e.g., local maximums and/or minimums). Given that an algorithm that finds a minimum of a function can generally also find a maximum of the same function by negating it, this disclosure will sometimes use the terms "minimization," "maximization," and "optimization," interchangeably.

An objective of optimization may be economic optimization, or determining economically optimal control variables to effectuate one or more changes to the electrical system to achieve economic efficiency (e.g., to operate the electrical system at as low a cost as may be possible, given the circumstances). As can be appreciated, other objectives may be possible as well (e.g., prolong equipment life, system reliability, system availability, fuel consumption, etc.).

The present disclosure includes embodiments of controllers that optimize a single parameterized cost function (or objective function) for effectively utilizing controllable components of an electrical system in an economically optimized manner. Various forms of optimization may be utilized to economically optimize an electrical system.

Continuous Optimization

A controller according to some embodiments of the present disclosure may use continuous optimization to determine the control variables. More specifically, the controller may utilize a continuous optimization algorithm, for example, to find economically optimal control variables to effectuate one or more changes to the electrical system to achieve economic efficiency (e.g., to operate the electrical system at as low a cost as may be possible, given the circumstances). The controller, in one embodiment, may operate on a single objective: optimize overall system economics. Since this approach has only one objective, there can be no conflict between objectives. And by specifying system economics appropriately in the cost function (or objective function), all objectives and value streams can be considered simultaneously based on their relative impact on a single value metric. The cost function may be continuous in its independent variables x, and optimization can be executed with a continuous optimization algorithm that is effective for continuous functions. Continuous optimization differs from discrete optimization, which involves finding the optimum value from a finite set of possible values or from a finite set of functions.

As can be appreciated, in another embodiment, the cost function may be discontinuous in x (e.g., discrete or finite) or piecewise continuous in x, and optimization can be executed with an optimization algorithm that is effective for discontinuous or piecewise continuous functions.

Constrained Optimization

In some embodiments, the controller utilizes a constrained optimization to determine the control variables. In certain embodiments, the controller may utilize a constrained continuous optimization to find a variable or variables $x_{opt}$ at which a continuous function f(x) is minimized or maximized subject to constraints on the allowable x.

Economically Optimizing Electrical System Controller

A controller, according to one embodiment of the present disclosure, will now be described to provide an example of using optimization to control an electrical system. An objective of using optimization may be to minimize the total electrical system operating cost during a period of time. For example, the approach of the controller may be to minimize the operating cost during an upcoming time domain, or future time domain, which may extend from the present time by some number of hours (e.g., integer numbers of hours, fractions of hours, or combinations thereof). As another example, the upcoming time domain, or future time domain, may extend from a future time by some number of hours. Costs included in the total electrical system operating cost may include electricity supply charges, electricity demand charges, a battery degradation cost, equipment degradation cost, efficiency losses, etc. Benefits, such as incentive payments, which may reduce the electrical system operating cost, may be incorporated (e.g., as negative numbers or values) or otherwise considered. Other cost may be associated with a change in energy in the ESS such that adding energy between the beginning and the end of the future time domain is valued. Other costs may be related to reserve energy in an ESS such as for backup power purposes. All of the costs and benefits can be summed into a net cost function, which may be referred to as simply the "cost function."

In certain embodiments, a control parameter set X can be defined (in conjunction with a control law) that is to be applied to the electrical system, how they should behave, and at what times in the future time domain they should be applied. In some embodiments, the cost function can be evaluated by performing a simulation of electrical system operation with a provided set X of control parameters. The control laws specify how to use X and the process variables to determine the control variables. The cost function can then be prepared or otherwise developed to consider the control parameter set X.

For example, a cost $f_c(X)$ may consider the control parameter values in X and return the scalar net cost of operating the electrical system with those control parameter values. All or part of the control parameter set X can be treated as a variable set $X_x$ (e.g., x as described above) in an optimization problem. The remaining part of X, $X_{logic}$, may be determined by other means such as logic (for example logic based on constraints, inputs, other control parameters, mathematical formulas, etc.). Any constraints involving $X_x$ can be defined, if so desired. Then, an optimization algorithm can be executed to solve for the optimal $X_x$. We can denote $X_{opt}$ as the combined $X_x$ and $X_{logic}$ values that minimize the cost function subject to the constraints, if any. Since $X_{opt}$ represents the control parameters, this example process fully specifies the control that will provide minimum cost (e.g., optimal) operation during the future time domain. Furthermore, to the limits of computing capability, this optimization can consider the continuous domain of possible $X_x$ values, not just a finite set of discrete possibilities. This example method continuously can "tune" possible control parameter sets until an optimal set is found. As shorthand notation, we may refer to these certain example embodiments of an economically optimizing electrical system controller (EOESC).

Some of the many advantages of using an EOESC, according to certain embodiments, compared to other electrical system controllers are significant:

1) Any number of value streams may be represented in the cost function, giving the EOESC an ability to optimize on all possible value streams and costs simultaneously. As an example, generalized continuous optimization can be used to effectively determine the best control given both ToU supply charge reduction and demand charge reduction simultaneously, all while still considering battery degradation cost.

2) With a sufficiently robust optimization algorithm, only the cost function, control law, and control parameter definitions need be developed. Once these three components are developed, they can be relatively easily maintained and expanded upon.

3) An EOESC can yield a true economically optimum control solution to machine or processor precision limited only by the cost function, control laws, and control parameter definitions.

4) An EOESC may yield not only a control to be applied at the present time, but also the planned sequence of future controls. This means one execution of an EOESC can generate a lasting set of controls that can be used into the future rather than a single control to be applied at the present. This can be useful in case a) the optimization algorithm takes a significant amount of time to execute, or b) there is a communication interruption between the processor calculating the control parameter values and the processor interpreting the control parameters and sending control variables to the electrical system.

Figure 3:
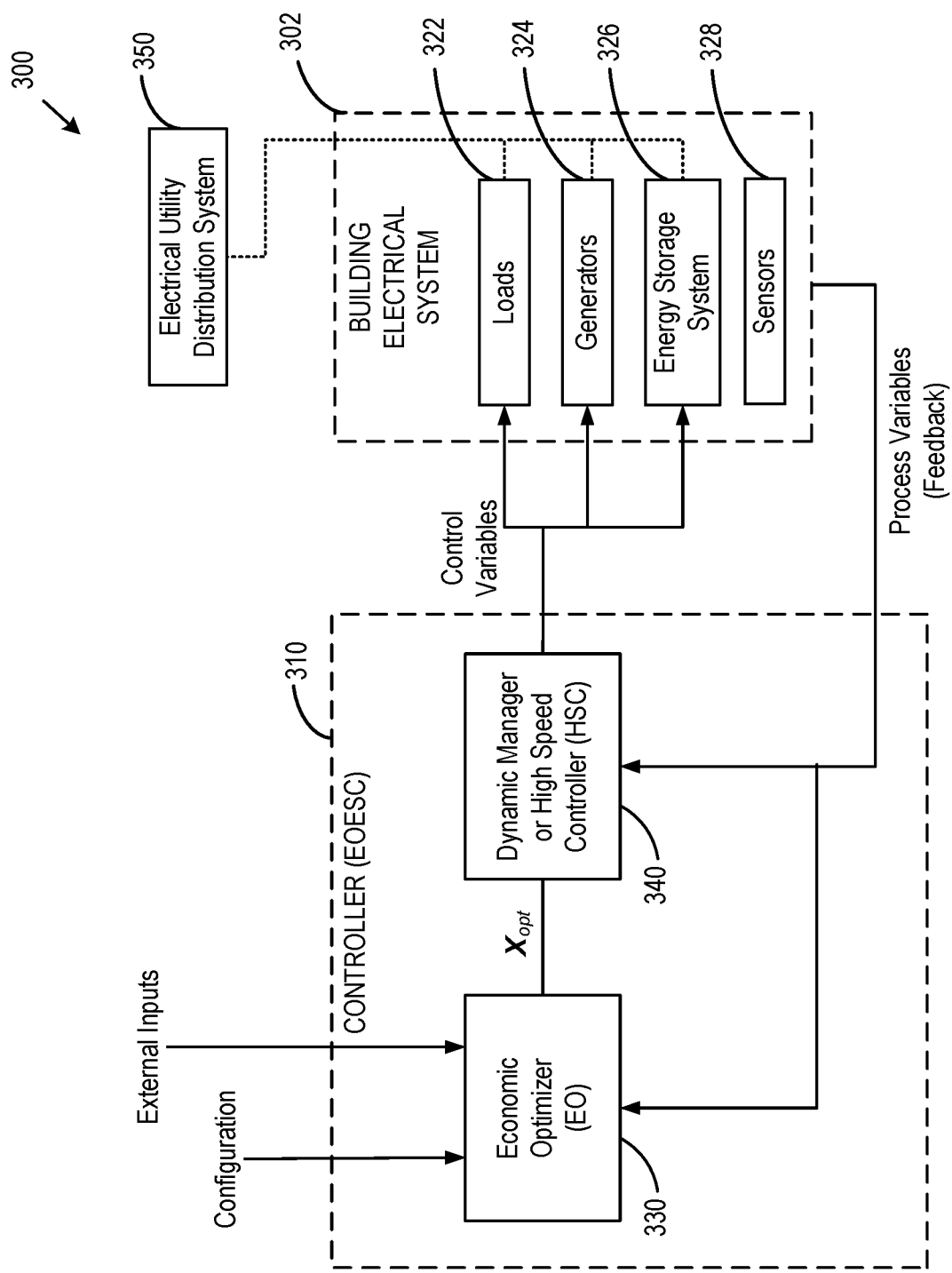
FIG. 3 is a block diagram illustrating a system architecture of a controllable electrical system, according to one embodiment of the present disclosure.

FIG. 3 is a control diagram of an electrical system 300, according to one embodiment of the present disclosure, including an EOESC 310. Stated otherwise, FIG. 3 is a diagram of a system architecture of the electrical system 300 including the EOESC 310, according to one embodiment. The electrical system 300 comprises a building electrical system 302 that is controlled by the EOESC 310. The building electrical system 302 includes one or more loads 322, one or more generators 324, an energy storage system (ESS) 326, and one or more sensors 328 (e.g., meters) to provide measurements or other indication(s) of a state of the building electrical system 302. The building electrical system 302 is coupled to an electrical utility distribution system 350, and therefore may be considered on-grid. Similar diagrams can be drawn for other applications such as a photovoltaic generator plant and an off-grid building.

The EOESC 310 receives or otherwise obtains a configuration of the electrical system, external inputs, and process variables and produces control variables to be sent to the electrical system 302 to effectuate a change to the electrical system toward meeting a controller objective for economical optimization of the electrical system, for example during an upcoming time domain. The EOESC 310 may include electronic hardware and software to process the inputs (e.g., the configuration of the electrical system, external inputs, and process variables) to determine values for each of the control variables. The EOESC 310 may include one or more processors and suitable storage media which stores programming in the form of executable instructions which are executed by the processors to implement the control processes.

In the embodiment of FIG. 3, the EOESC 310 includes an economic optimizer (EO) 330 and a dynamic manager 340 (or high speed controller (HSC)). The EO 330 according to some embodiments is presumed to have ability to measure or obtain a current date and time. The EO 330 may determine a set of values for a control parameter set X and provide the set of values and/or the control parameter set X to the HSC 340. The EO 330 uses a generalized optimization algorithm to determine an optimal set of values for the control parameter set $X_{opt}$. The HSC 340 utilizes the set of values for the control parameter set X (e.g., an optimal control parameter set $X_{opt}$) to determine the control variables to communicate to the electrical system 302. The HSC 340 in some embodiments is also presumed to have ability to measure or obtain a current date and time. The two part approach of the EOESC 310, namely the EO 330 determining control parameters and then the HSC 340 determining the control variables, enables generation of a lasting set of controls, or a control solution (or plan) that can be used into the future rather than a single control to be applied at the present. Preparing a lasting control solution can be useful if the optimization algorithm takes a significant amount of time to execute. Preparing a lasting control solution can also be useful if there is a communication interruption between the calculating of the control parameter values and the processor interpreting the control parameters and sending control variables to the electrical system 302. The two part approach of the EOESC 310 also enables the EO 330 to be disposed or positioned at a different location from the HSC 340. In this way, intensive computing operations that optimization may require can be performed by resources with higher processing capability that may be located remote from the building electrical system 302. These intensive computing operations may be performed, for example, at a data center or server center (e.g., in the cloud).

In some embodiments, a future time domain begins at the time the EO 330 executes and can theoretically extend any amount of time. In certain embodiments, analysis and experimentation suggest that a future time domain extent of 24 to 48 hours generates sufficiently optimal solutions in most cases.

As can be appreciated, the EOESC 310 of FIG. 3 may be arranged and configured differently from that shown in FIG. 3, in other embodiments. For example, instead of the EO 330 passing the control parameter set $X_{opt}$ (the full set of control parameters found by a generalized optimization algorithm of the EO 330) to the HSC 340, the EO 330 can pass a subset of $X_{opt}$ to the HSC 340. Similarly, the EO 330 can pass $X_{opt}$ and additional control parameters to the HSC 340 that are not contained in $X_{opt}$. Likewise, the EO 330 can pass modified elements of $X_{opt}$ to the HSC 340. In one embodiment, the EO 330 finds a subset $X_x$ of the optimal X, but then determines additional control parameters $X_{logic}$, and passes $X_{logic}$ together with $X_x$ to the HSC 340. In other words, in this example, the $X_x$ values are to be determined through an optimization process of the EO 330 and the $X_{logic}$ values can be determined from logic. An objective of the EO 330 is to determine the values for each control parameter whether using optimization and/or logic.

For brevity in this disclosure, keeping in mind embodiments where X consists of independent ($X_x$) parameters and dependent ($X_{logic}$) parameters, when describing optimization of a cost function versus X, what is meant is variation of the independent variables $X_x$ until an optimum (e.g., minimum) cost function value is determined. In this case, the resulting $X_{opt}$ will consist of the combined optimum $X_x$ parameters and associated $X_{logic}$ parameters.

In one embodiment, the EOESC 310 and one or more of its components are executed as software or firmware (for example stored on non-transitory media, such as appropriate memory) by one or more processors. For example, the EO 330 may comprise one or more processors to process the inputs and generate the set of values for the control parameter set X. Similarly, the HSC 340 may comprise one or more processors to process the control parameter set X and the process variables and generate the control variables. The processors may be computers, microcontrollers, CPUs, logic devices, or any other digital or analog device that can operate on pre-programmed instructions. If more than one processor is used, they can be connected electrically, wirelessly, or optically to pass signals between one another. In addition, the control variables can be communicated to the electrical system components electrically, wirelessly, or optically or by any other means. The processor has the ability to store or remember values, arrays, and matrices, which can be viewed as multi-dimensional arrays, in some embodiments. This storage may be performed using one or more memory devices, such as read access memory (RAM, disk drives, etc.).

Figure 4:
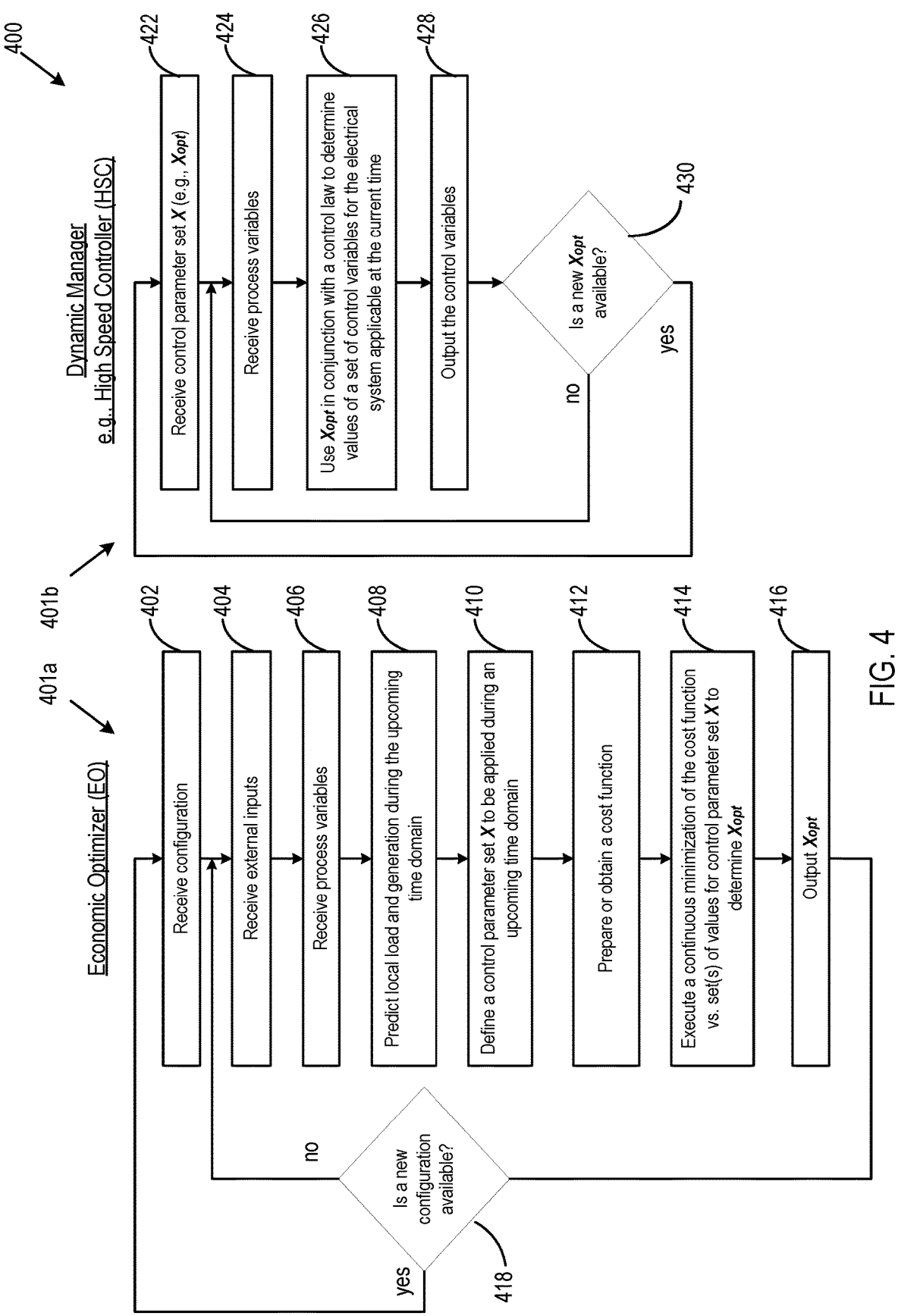
FIG. 4 is a flow diagram of a method or process of controlling an electrical system, according to one embodiment of the present disclosure.

FIG. 4 is a flow diagram of a method 400 of controlling an electrical system, according to one embodiment of the present disclosure. The method 400 includes two separate processes, namely an economic optimizer (EO) process 401*a* and a high speed controller (HSC) process 401*b*. The HSC process 401*b* may also be referred to herein as a dynamic manager process 401*b*. The HSC process 401*b* may utilize a control parameter set X determined by the EO process 401*a*. Nevertheless, the HSC process 401*b* may execute separate from, or even independent from the EO process 401*a*, based on a control parameter set X determined at an earlier time by the EO process 401*a*. Because the EO process 401*a* can run separate and distinct from the HSC process 401*b*, the execution of these processes 401*a*, 401*b* may be collocated on a single system or isolated on remote systems.

The EO process 401*a* may be a computer-implemented process executed by one or more computing devices, such as the EO 330 of FIG. 3. The EO process 401*a* may receive 402 a configuration, or a set of configuration elements, of the electrical system. The configuration may specify one or more constraints of the electrical system. The configuration may specify one or more constants of the electrical system. The configuration may specify one or more cost elements associated with operation of the electrical system. The cost elements may include one or more of an electricity cost (e.g., an electricity supply charge, an electricity demand charge), a battery degradation cost, equipment degradation cost, a tariff definition (e.g., an electricity supply tariff providing ToU supply rates and associated time windows, or an electricity demand tariff providing demand rates and associated time windows), a cost of local generation, penalties associated with deviation from an operating plan (e.g., a prescribed operating plan, a contracted operating plan), costs or benefits associated with a change in energy in the ESS such that adding energy between the beginning and the end of the future time domain is valued, costs or benefits (e.g., a payment) for contracted maneuvers, costs or benefits associated with the amount of energy stored in an ESS as a function of time, a value of comfort that may be a function of other process variables such as building temperature.

In certain embodiments, the set of configuration elements define the one or more cost elements by specifying how to calculate an amount for each of the one or more cost elements. For example, the definition of a cost element may include a formula for calculating the cost element.

In certain embodiments, the cost elements specified by the configuration elements may include one or more incentives associated with operation of the electrical system. An incentive may be considered as a negative cost. The one or more incentives may include one or more of an incentive revenue, a demand response revenue, a value of reserve energy or battery capacity (e.g., for backup power as a function of time), a contracted maneuver, revenue for demand response opportunities, revenue for ancillary services, and revenue associated with deviation from an operating plan (e.g., a prescribed operating plan, a contracted operating plan).

In other embodiments, the configuration elements may specify how to calculate an amount for one or more of the cost elements. For example, a formula may be provided that indicates how to calculate a given cost element.

External inputs may also be received 404. The external inputs may provide indication of one or more conditions that are external to the controller and/or the electrical system. For example, the external inputs may provide indication of the temperature, weather conditions (e.g., patterns, forecasts), and the like.

Process variables are received 406. The process variables provide one or more measurements of a current state of the electrical system. The set of process variables can be used to determine progress toward meeting an objective for economical optimization of the electrical system. The process variables may be feedback in a control loop for controlling the electrical system.

The EO process 401*a* may include predicting 408 a local load and/or generation during an upcoming time domain. The predicted local load and/or local generation may be stored for later consideration. For example, the predicted load and/or generation may be used in a later process of evaluating the cost function during a minimization of the cost function.

A control parameter set X may be defined 410 to be applied during an upcoming time domain. In defining the control parameter set X, the meaning of each element of X is established. A first aspect in defining 410 the control parameter set X may include selecting a control law. Then, for example, X may be defined 410 as a matrix of values such that each column of X represents a set of control parameters for the selected control law to be applied during a particular time segment of the future time domain. In this example, the rows of X represent individual control parameters to be used by the control law. Further to this example, the first row of X can represent the nominal ESS power during a specific time segment of the future time domain. Likewise, X may be further defined such that the second row of X is the maximum demand limit (e.g., a maximum demand setpoint). A second aspect in defining 410 may include splitting the upcoming time domain into sensible segments and selecting the meaning of the control parameters to use during each segment. The upcoming future time domain may be split into different numbers of segments depending on what events are coming up during the future time domain. For example if there are no supply charges, and there is only one demand period, the upcoming time domain may be split into a few segments. But if there is a complicated scenario with many changing rates and constraints, the upcoming time domain may be split into many segments. Lastly, in defining 410 the control parameters X, some control parameters $X_x$ may be marked for determination using optimization, and others $X_{logic}$ may be marked for determination using logic (for example logic based on constraints, inputs, other control parameters, mathematical formulas, etc.).

The EO process 401*a* may also prepare 412 or obtain a cost function. Preparing 412 the cost function may be optional and can increase execution efficiency by pre-calculating certain values that will be needed each time the cost function is evaluated. The cost function may be prepared 412 (or configured) to include or account for any constraints on the electrical system.

With the control parameter set X defined 410 and the cost function prepared 412, the EO process 401*a* can execute 414 a minimization or optimization of the cost function resulting in the optimal control parameter set $X_{opt}$. For example, a continuous optimization algorithm may be used to identify an optimal set of values for the control parameter set $X_{opt}$ (e.g., to minimize the cost function) in accordance with the one or more constraints and the one or more cost elements. The continuous optimization algorithm may be one of many types. For example, it may be a generalized continuous optimization algorithm. The continuous optimization algorithm may be a multivariable continuous optimization algorithm. The continuous optimization algorithm may be a constrained continuous optimization algorithm. The continuous optimization algorithm may be a Newton-type algorithm. It may be a stochastic-type algorithm such as Covariance Matrix Adaption Evolution Strategy (CMAES). Other algorithms that can be used are BOBYQA (Bound Optimization by Quadratic Approximation) and COBYLA (Constrained Optimization by Linear Approximation).

To execute the optimization of the cost function, the cost function may be evaluated many times. Each time, the evaluation may include performing a simulation of the electrical system operating during the future time domain with a provided control parameter set X, and then calculating the cost associated with that resulting simulated operation. The cost function may include or otherwise account for the one or more cost elements received 402 in the configuration. For example, the cost function may be a summation of the one or more cost elements (including any negative costs, such as incentive, revenues, and the like). In this example, the optimization step 414 would find $X_{opt}$ that minimizes the cost function. The cost function may also include or otherwise account for the one or more constraints on the electrical system. The cost function may include or otherwise account for any values associated with the electrical system that may be received 402 in the configuration.

The cost function may also evaluate another economic metric such as payback period, internal rate of return (IRR), return on investment (ROI), net present value (NPV), or carbon emission. In these examples, the function to minimize or maximize would be more appropriately termed an "objective function." In case the objective function represents a value that should be maximized such as IRR, ROI, or NPV, the optimizer should be set up to maximize the objective function when executing 414, or the objective function could be multiplied by −1 before minimization. Therefore, as can be appreciated, elsewhere in this disclosure, "minimizing" the "cost function" may also be more generally considered for other embodiments as "optimizing" an "objective function."

The continuous optimization algorithm may execute the cost function (e.g., simulate the upcoming time domain) a plurality of times with various parameter sets X to identify an optimal set of values for the control parameter set $X_{opt}$ to minimize the cost function. The cost function may include a summation of the one or more cost elements and evaluating the cost function may include returning a summation of the one or more cost elements incurred during the simulated operation of the control system over the upcoming time domain.

The optimal control parameter set $X_{opt}$ is then output 416. In some embodiments, the output 416 of the optimal control parameter set $X_{opt}$ may be stored locally, such as to memory, storage, circuitry, and/or a processor disposed local to the EO process 401*a*. In some embodiments, the outputting 416 may include transmission of the optimal control parameter set $X_{opt}$ over a communication network to a remote computing device, such as the HSC 340 of FIG. 3.

The EO process 401*a* repeats for a next upcoming time domain (a new upcoming time domain). A determination 418 is made whether a new configuration is available. If yes, then the EO process 401*a* receives 402 the new configuration. If no, then the EO process 401*a* may skip receiving 402 the configuration and simply receive 404 the external inputs.

As can be appreciated, in other embodiments an EO process may be configured differently, to perform operations in a differing order, or to perform additional and/or different operations. In certain embodiments, an EO process may determine values for a set of control variables to provide to the electrical system to effectuate a change to the electrical system toward meeting the controller objective for economical optimization of the electrical system during an upcoming time domain, rather than determining values for a set of control parameters to be communicated to a HSC process. The EO process may provide the control variables directly to the electrical system, or to an HSC process for timely communication to the electrical system at, before, or during the upcoming time domain.

The HSC process 401*b* may be a computer-implemented process executed by one or more computing devices, such as the HSC 340 of FIG. 3. The HSC process 401*b* may receive 422 a control parameter set X, such as the optimal control parameter set $X_{opt}$ output 416 by the EO process 401*a*. Process variables are also received 424 from the electrical system. The process variables include information, or feedback, about a current state or status of the electrical system and/or one or more components therein.

The HSC process 401*b* determines 426 values for a set of control variables for controlling one or more components of the electrical system at the current time. The HSC process 401*b* determines 426 the values for the control variables by using the optimal control parameter set $X_{opt}$ in conjunction with a control law. The control laws specify how to determine the control variables from X (or $X_{opt}$) and the process variables. Stated another way, the control law enforces the definition of X. For example, for a control parameter set X defined such that a particular element, $X_i$, is an upper bound on demand to be applied at the present time, the control law may compare process variables such as the unadjusted demand to $X_i$. If unadjusted building demand exceeds $X_i$, the control law may respond with a command (in the form of a control variable) to instruct the ESS to discharge at a rate that will make the adjusted demand equal to or less than $X_i$.

The control variables (including any newly determined values) are then output 428 from the HSC process 401*b*. The control variables are communicated to the electrical system and/or one or more components therein. Outputting 428 the control variables may include timely delivery of the control variables to the electrical system at, before, or during the upcoming time domain and/or applicable time segment thereof. The timely delivery of the control variables may include an objective to effectuate a desired change or adjustment to the electrical system during the upcoming time domain.

A determination 430 is then made whether a new control parameter set X (and/or values thereof) is available. If yes, then the new control parameter set X (or simply the values thereof) is received 422 and HSC process 401*b* repeats. If no, then the HSC process 401b repeats without receiving 422 a new control parameter set X, such as a new optimal control parameter set $X_{opt}$.

As can be appreciated, in other embodiments an HSC process may be configured differently, to perform operations in a differing order, or to perform additional and/or different operations. For example, in certain embodiments, an HSC process may simply receive values for the set of control variables and coordinate timely delivery of appropriate control variables to effectuate a change to the electrical system at a corresponding time segment of the upcoming time domain.

The example embodiment of a control 310 in FIG. 3 and a control method 400 in FIG. 4 illustrate a two-piece or staged controller, which split a control problem into two pieces (e.g., a low speed optimizer and a high speed dynamic manager (or high speed controller (HSC)). The two stages or pieces of the controller, namely an optimizer and a dynamic manager, are described more fully the sections below.

Economic Optimizer (EO)

Greater detail will now be provided about some elements of an EO, according to some embodiments of the present disclosure.

Predicting a Load/Generation of an Upcoming Time Domain

In many electrical system control applications, a load of the electrical system (e.g., a building load) changes over time. Load can be measured as power or as energy change over some specified time period, and is often measured in units of kW. As noted above with reference to FIG. 4, an EO process 401a may predict 408 a local load and/or generation during an upcoming time domain.

Define the Control Parameter Set X

Defining the Control Parameter Set X involves defining or otherwise specifying times at which each control parameter is to be applied during a future time domain, and the control law(s) that are to be applied at each time in the future time domain.

An EO, according to certain embodiments of the present disclosure, is configured to define the control parameter set X. While there are many ways to define a control parameter set X, three possible approaches are:

1. a single set of parameters of a control law to be applied during the entire upcoming time domain;
2. a sequence of parameter sets that are each to be applied to a single control law at different contiguous sequential time intervals throughout the upcoming time domain; and
3. a sequence of parameters that specifies different control laws to be applied at different contiguous sequential time intervals throughout the future time domain.

An example of Approach 1 above of a single set of parameters of the control parameter set X (and example values) for a four-parameter control law is shown in Table 1.

TABLE 1

| Parameter | Description | Example Value |
|---|---|---|
| $P_{nom}$ | Nominal ESS power (or discharge power if negative) to be applied in the absence of other constraints or rules (such as those related to UB, $UB_0$, or LB below). | −40 W |
| UB | Upper bound on adjusted demand (e.g., an upper setpoint). Not to be exceeded unless the ESS is incapable of discharging at sufficient power. | 100 kW |

TABLE 1-continued

| Parameter | Description | Example Value |
|---|---|---|
| $UB_0$ | Upper bound on electrical system adjusted demand (e.g., an upper setpoint) not to be actively exceeded (e.g., electrical system adjusted demand may exceed this value only with ESS power less than or equal to 0). | 80 kW |
| LB | Lower bound on adjusted net power (e.g., a lower setpoint). Sometimes referred to as "minimum import," or, if 0, "zero export." Adjusted net power will be kept above this value unless the ESS is incapable of charging at sufficient power and generators cannot be throttled sufficiently. | 0 kW |

Approaches 2 and 3 above utilize segmentation of the future time domain.

Figure 5:
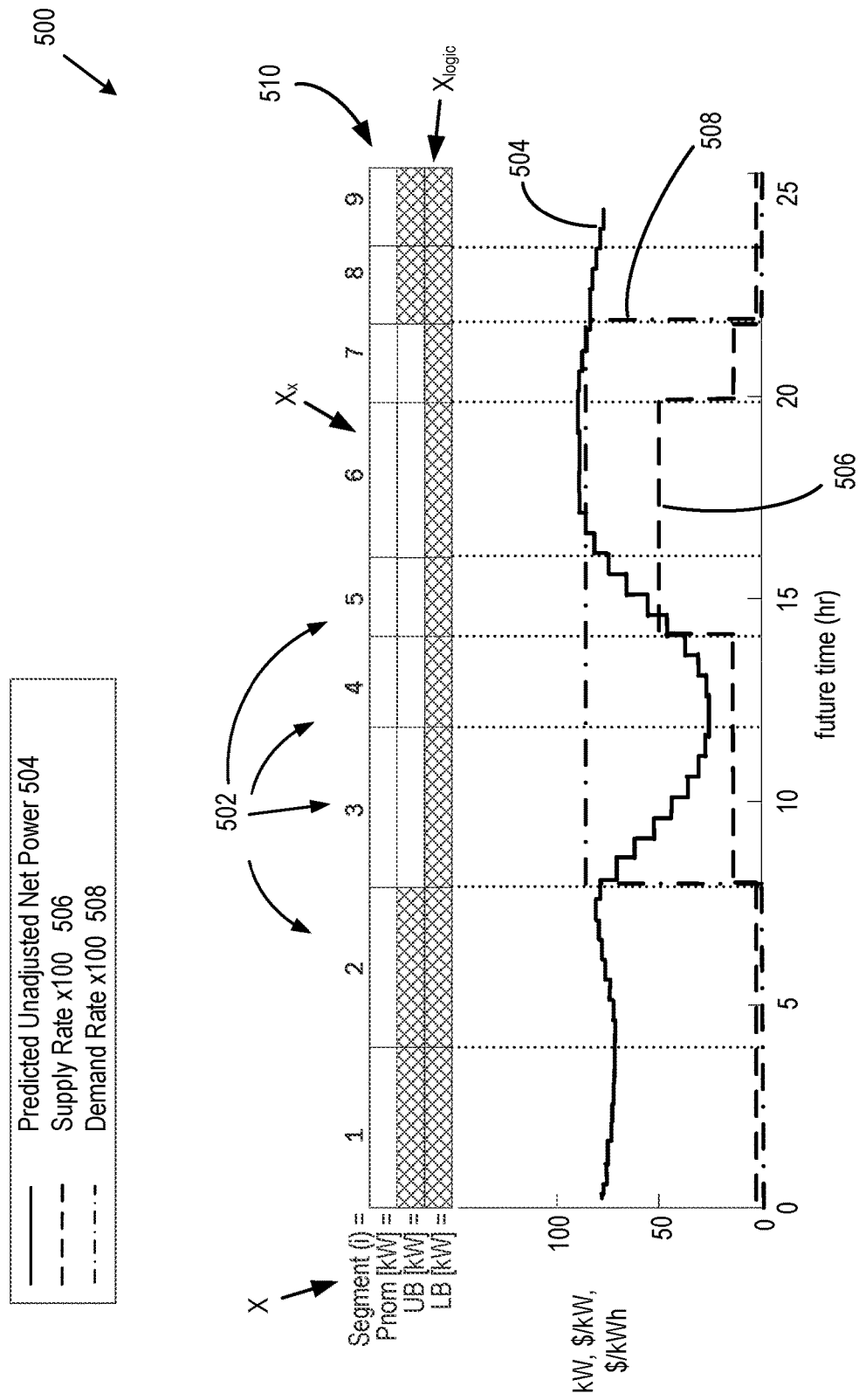
FIG. 5 is a graph illustrating one example of segmenting an upcoming time domain into multiple time segments.

FIG. 5 is a graph 500 illustrating one example of segmenting an upcoming time domain into a plurality of time segments 502. A plot 504 of predicted unadjusted net power (kW) versus future time (e.g., of an upcoming time domain) is provided. A plot 506 of energy supply rate ($/kWh) versus future time is also provided. A plot 508 of a demand rate ($/kW) versus future time is also provided. A 25-hour future time domain is segmented into nine discrete sequential time segments 502 (e.g., i=1, 2, 3, 4, 5, 6, 7, 8, 9). Each segment 502 will be assigned a single set of one or more parameters from the control parameter set X to be applied during that time segment.

Segmentation of the future time domain can be done in many ways. In one embodiment, segmentation is performed such that:

i. the electric rates (both supply and demand) are constant within each time segment, ii. the number of segments is minimized but large enough to provide a different segment for each region of the future time domain that is expected to have significantly different operating behavior or conditions, and iii. the segment length does not exceed a prescribed maximum segment length.

In cases where rates are changing very frequently (every hour for example), some minimum time segment length can be specified (every four hours for example) to reduce the number of time segments while still maintaining acceptable computational fidelity. Likewise, a maximum segment length (for example six hours) may also be prescribed to increase computational fidelity.

Smaller numbers of segments are less burdensome on the EO processor computationally, while large numbers of segments provide higher fidelity in the final optimized solution. A desirable segment length of between 0.5 and 6 hours in some embodiments has been found to provide a good balance between these criteria.

The time segments of the upcoming time domain may be defined such that one or more of supply rate cost elements and delivery rate cost elements are constant during each time segment. The time segments of the upcoming time domain may be defined such that one or more of contracted maneuvers, demand response maneuvers, and ancillary service maneuvers are continuous during each time segment.

FIG. 5 also illustrates a representation 510 of an example of control parameter set X that includes multiple sets of parameters. The control parameter set X is for a three-parameter control law, which may be defined similar to the set illustrated above in Table 1, but without $UB_0$. The values for the parameters are not initialized, but the cells of the table X in FIG. 5 represent a parameter for which a value may be associated. In this example, the un-shaded values ($X_x$) are to be determined through an optimization process of the EO and the shaded values ($X_{logic}$) can be determined from logic. An objective of the EO is to fill in the values for each control parameter that minimizes the cost of operating the electrical system during the future time domain.

In some instances, it may make sense for an EO (or an EOESC) to operate with a single control parameter (e.g., a single set with a single element in X, such as $P_{nom}$) or with multiple control parameters (a single set of multiple elements in X, such as $P_{nom}$, UB, and LB) to be applied during the entire future time domain. In these two cases, the future time domain would be segmented into only one time segment 502. Correspondingly, the EO would only consider control parameters that are constant over the whole future time domain in this example.

Prepare the Cost Function

An EO, according to certain embodiments of the present disclosure, prepares or otherwise obtains a cost function. As already mentioned, the cost function $f_c(X)$ is a function that considers particular control parameters (e.g., control parameter set X) and returns the scalar net cost of operating the electrical system with X during the future time domain.

Evaluation of the Cost Function

During execution of an EO, according to some embodiments of the present disclosure, the cost function is evaluated. During evaluation of the cost function, operation of the electrical system with the control parameter set X is simulated. The simulation may be an aspect of evaluating the cost function. Stated otherwise, one part of evaluating the cost function for a given control parameter set X may be simulating operation of the electrical system with that given control parameter set X. In the simulation, the previously predicted load and generation are applied. The simulation takes place on the future time domain. As time advances through the future time domain in the simulation, costs and benefits (as negative costs) can be accumulated. What is finally returned by the simulation is a representation of how the electrical system state may evolve during the future time domain with control X, and what costs may be incurred during that time.

In some embodiments, the cost function, when evaluated, returns the cost of operating the electrical system with some specific control parameter set X. As can be appreciated, the cost of operating an electrical system may be very different, depending on X. So evaluation of the cost function includes a simulated operation of the electrical system with X first. The result of the simulation can be used to estimate the cost associated with that scenario (e.g., the control parameter set X).

As noted previously, some of the costs considered by the cost function in one embodiment are:

1. Electricity supply charges (both flat rates and ToU rates)
2. Electricity demand charges
3. Battery degradation cost
4. Reduction of energy stored in the energy storage system
5. Incentive maneuver benefits (as a negative number)

Electricity supply and demand charges have already been described. For monthly demand charges, the charge may be calculated as an equivalent daily charge by dividing the charge by approximately 30 days, or by dividing by some other number of days, depending on how many days are remaining in the billing cycle. Battery degradation cost is described in a later section. Reduction in energy stored in an ESS accounts for the difference in value of the storage energy at the beginning of the future time domain compared to the end. Incentive maneuver benefits such as demand response can be calculated as the benefit on a per day basis, but as a negative number.

During the cost function's electrical system simulation, several variables can be tracked and stored in memory. These include control variables, electrical power consumed by or supplied from various electrical systems, and the states of charge of any energy storage systems. Other variables can also be tracked and stored to memory. Any of the variables stored to memory can be output by the cost function.

Execute Continuous Minimization of the Cost Function

With a prediction of load and generation made, the control parameter set X defined, and the cost function obtained and initialized and/or prepared, minimization of cost can be performed.

Minimization of the cost function may be performed by an optimization process or module that is based on an optimization algorithm. Minimization (or optimization) may include evaluating the cost function iteratively with different sets of values for the control parameter set X (e.g., trying different permutations from an initial value) until a minimum cost (e.g., a minimum value of the cost function) is determined. In other words, the algorithm may iteratively update or otherwise change values for the control parameter set X until the cost function value (e.g. result) converges at a minimum (e.g., within a prescribed tolerance). The iterative updating or changing of the values may include perturbing or varying one or more values based on prior one or more values.

Termination criteria (e.g., a prescribed tolerance, a delta from a prior value, a prescribed number of iterations) may aid in determining when convergence at a minimum is achieved and stopping the iterations in a finite and reasonable amount of time. The number of iterations that may be performed to determine a minimum could vary from one optimization cycle to a next optimization cycle. The set of values of the control parameter set X that results in the cost function returning the lowest value may be determined to be the optimal control parameter set $X_{opt}$.

In one embodiment, a numerical or computational generalized constrained nonlinear continuous optimization (or minimization) algorithm is called (e.g., executed) by a computing device.

Figure 6:
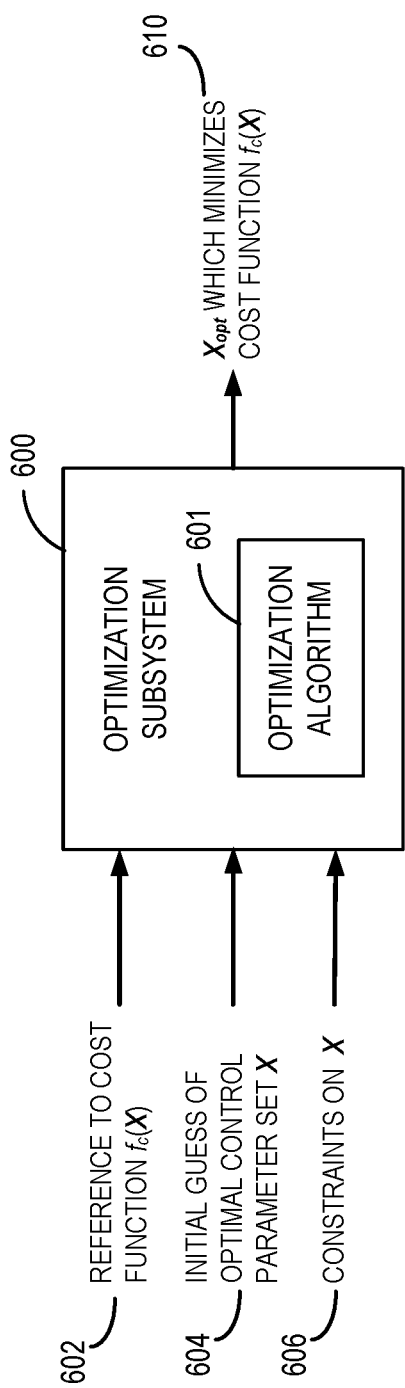
FIG. 6 is a diagrammatic representation of an optimizer that utilizes an optimization algorithm to determine an optimal control parameter set.

FIG. 6 is a diagrammatic representation of an optimization subsystem 600 that utilizes or otherwise implements an optimization algorithm 601 to determine an optimal control parameter set $X_{opt}$ 610, which minimizes the cost function $f_c(X)$. In the embodiment of FIG. 6, the optimization algorithm 601 utilized by the optimization subsystem 600 may be a generalized constrained multivariable continuous optimization (or minimization) algorithm. A reference 602 is provided for the cost function $f_c(X)$.

The optimization algorithm can be implemented in software, hardware, firmware, or any combination of these. The optimization algorithm may be implemented based on any approach from descriptions in literature, pre-written code, or developed from first principles. The optimization algorithm implementation can also be tailored to the specific problem of electrical system economic optimization, as appropriate in some embodiments.

Some algorithms for generalized constrained multivariable continuous optimization include:

Trust-region reflective
Active set
SQP
Interior Point

Covariance Matrix Adaption Evolution Strategy (CMAES)

Bound Optimization by Quadratic Approximation (BOBYQA)

Constrained Optimization by Linear Approximation (COBYLA)

The optimization algorithm may also be a hybrid of more than one optimization algorithm. For example, the optimization algorithm may use CMAES to find a rough solution, then Interior Point to converge tightly to a minimum cost. Such hybrid methods may produce robust convergence to an optimum solution in less time than single-algorithm methods.

Regardless of the algorithm chosen, it may be useful to make an initial guess of the control parameter set X 604. This initial guess enables an iterative algorithm such as those listed above to more quickly find a minimum. In one embodiment, the initial guess is derived from the previous EO execution results.

Any constraints 606 on X can also be defined or otherwise provided. Example constraints include any minimum or maximum control parameters for the electrical system.

An Example EO Result

Figure 7:
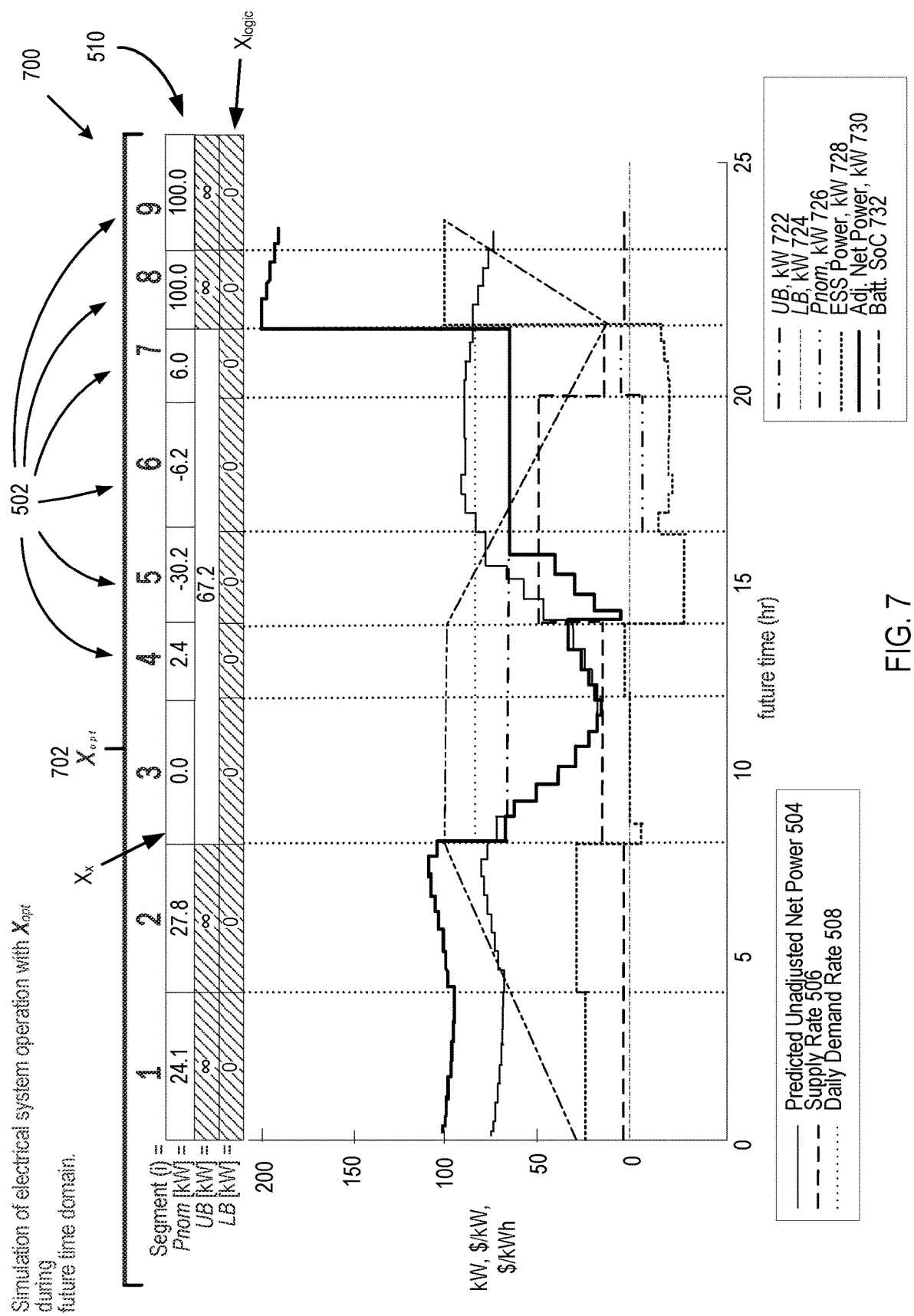
FIG. 7 is a graph illustrating an example result (e.g., a control parameter set) from an economic optimizer (EO) for a battery ESS.

FIG. 7 is a graph 700 illustrating an example result from an EO for a small battery energy storage system, using the same example upcoming time domain, segmentation of the upcoming time domain into a plurality of segments 502, predicted unadjusted net power plot 504, supply rate plot 506, daily demand rate plot 508, and representation 510 of the control parameter set X as in FIG. 5.

The graph 700 also includes plots for UB (kW) 722, LB (kW) 724, Pnom (kW) 726, ESS power (kW) 728, adjusted net power (kW) 730, and battery SoC 732.

In FIG. 7, as in FIG. 5, the future time domain is split into nine segments 502, and nine optimal sets of parameters 702 were determined (e.g., a control parameter set $X_{opt}$ 510 that includes values for nine optimal sets of parameters, one optimal set of parameters for each segment 502). Daily demand charges are applicable and a net export of energy (e.g., to the grid) is not allowed in the illustrated example. An objective of the controller is to find an optimal sequence of electrical system control parameters.

The control parameter set X in this case is defined to include three parameters: Pnom, UB, and LB as described above. In this example, during execution of the optimization algorithm, the optimal values in the unshaded boxes ($X_x$) of the representation 510 of X are determined, $P_{nom}$ 702 which is the battery inverter power (where charge values are positive and generation/discharge values are negative) during each time segment 502, and UB 702 which is the upper limit on demand during each time segment 502). The date and time to apply each specific control parameter is part of the definition of X. The shaded values ($X_{logic}$, which includes LB and some UB values) in the representation 510 of X are determined by logic. For example, when no demand charge is applicable, the UB can be set to infinity. And since net export of power is not permitted in this example, LB can be set to zero. There is no need to determine optimal values for these shaded parameters when executing the optimization because their values are dictated by constraints and logic.

Applying the optimal values of X, the expected cost per day of operating the electrical system in the example of FIG. 7 is $209.42 per day. This total cost is the sum of the ToU supply cost ($248.52), the daily demand cost ($61.52), the cost of battery energy change ($-115.93), and the cost of battery degradation ($15.32).

As can be appreciated, in other embodiments, the EO may determine a set of control values for a set of control variables, instead of a control parameter set X. The EO may determine the set of control values to effectuate a change to the electrical system toward meeting a controller objective for economical optimization of the electrical system. The EO may then output the control values or the set of control variables for delivery directly to the electrical system. In such embodiment, the EO may be a primary component of the controller and the controller may not include a dynamic manager (e.g., a high speed controller).

Dynamic Manager or High Speed Controller (HSC)

Greater detail will now be provided about some elements of a dynamic manager, or an HSC, according to some embodiments of the present disclosure. Because the control parameter set X is passed to the high speed controller, the definition of the control parameter set X may be tightly linked to the HSC's control law. The interaction between an example HSC and control parameter set X is described below.

Storing a Control Plan

As already mentioned, the control parameter set X can contain multiple sets of parameters and dates and times that those sets of parameters are meant to be applied by the HSC. One embodiment of the present disclosure takes this approach. Multiple sets of parameters are included in X, each set of parameters with a date and time the set is intended to be applied to the electrical system being controlled. Furthermore, each controllable system within the electrical system can have a separate set of controls and date and time on which the set of controls is intended to be applied. The HSC commits the full control parameter set X to memory and applies each set of parameters therein to generate control variables to deliver to, and potentially effectuate a change to, the electrical system at the specified times. Stated differently, the HSC stores and schedules a sequence of optimal sets of parameters, each to be applied at an appropriate time. In other words, the HSC stores a control plan. This first task of storing and scheduling a sequence of optimal control parameter sets (e.g., a control plan) by the high speed controller provides distinct advantages over other control architectures.

For example, storing of a control plan by the HSC reduces the frequency that the computationally intensive (EO) portion of the controller is executed. This is because even if the first sequential time interval expires before the EO executes again, the HSC will switch to the next sequential control parameter set at the appropriate time. In other words, the EO does not have to execute again before the first sequential time interval expires since multiple optimal control parameter sets can be queued up in sequence.

As another example, storing of a control plan by the HSC enables operation (e.g., control of the electrical system) for significant periods of time without additional EO output. This may be important for example if the EO is executing in a remote processor such as a cloud computing environment and the HSC is running on a processor local to a building. If communication is lost for a period of time less than the future time domain, the HSC can continue to use the already-calculated optimal control parameter sets at the appropriate times. Although operation in such a manner during outage may not be optimal (because fresh EO executions are desirable as they take into account the latest data), this approach may be favored compared with use of a single invariant control parameter set or shutting down.

Application of Presently Applicable Control Parameters

A second task of the HSC, according to one embodiment, is to control some or all of the electrical system components within the electrical system based on the presently applicable control parameter set. In other words, the HSC applies each set of parameters of a control parameter set X in conjunction with a control law to generate control variables to deliver to, and potentially effectuate a change to, the electrical system at appropriate times.

For an electrical system with a controllable battery ESS, this second task of the HSC may utilize four parameters for each time segment. Each of the four parameters may be defined as in Table 1 above. In one embodiment, these parameters are used by the HSC to control the battery inverter to charge or discharge the energy storage device. For a battery ESS, the typical rate at which the process variables are read and used by the HSC and new control variables are generated may be from 10 times per second to once per 7 minutes. The control variables (or the set of values for the set of control variables) for a given corresponding time segment may be provided to the electrical system at (e.g., before or during) the given corresponding time segment of the upcoming time domain.

As can be appreciated, in other embodiments, an entire control plan (e.g., a control parameter set X comprising a set of sets) may be processed by the HSC to determine a plurality of sets of control variables, each set of control variables for a corresponding time segment. The plurality of sets of control variables may be provided at once (e.g., before the upcoming time domain or no later than during a first time segment of the upcoming time domain). Or, each set of the plurality of sets may be provided individually to the electrical system at (e.g., before or during) the given corresponding time segment.

Another aspect of the HSC, according to one embodiment, is that the HSC can also be used to curtail a generator (such as a photovoltaic generator) if necessary to maintain the lower bound on electrical system power consumption specified by LB.

Figure 8:
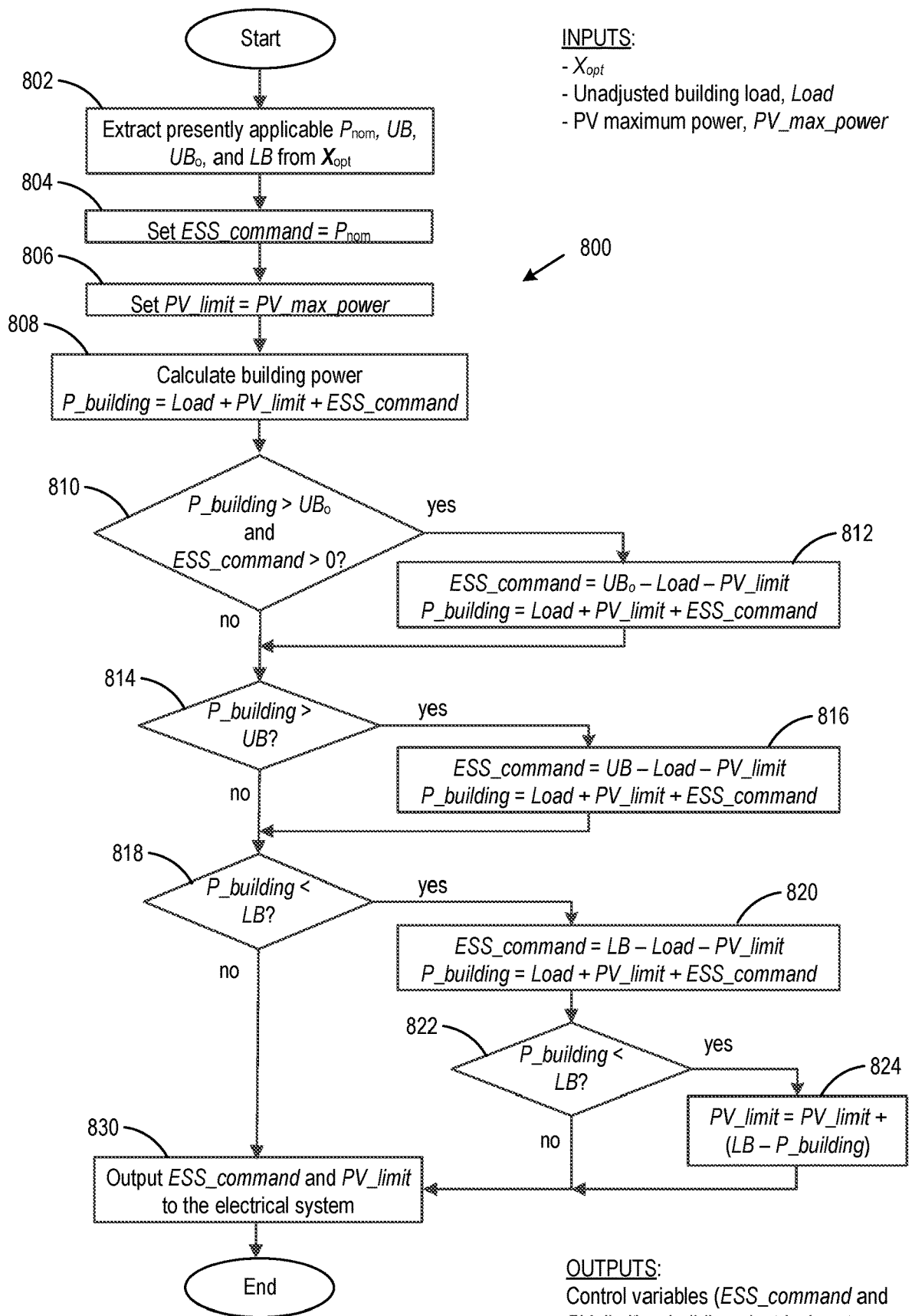
FIG. 8 is a method of a dynamic manager, according to one embodiment of the present disclosure.

FIG. 8 is a method 800 of a dynamic manager, or HSC, according to one embodiment of the present disclosure, to use a set of optimal control parameters $X_{opt}$ in conjunction with a control law to determine values of a set of control variables to command the electrical system. A set of optimal control parameters ($X_{opt}$), a measurement of unadjusted building load (Load), and PV maximum power (PV_max_power) are received or otherwise available as inputs to the method 800. The dynamic manager processes $X_{opt}$ to determine a set of control values to effectuate a change to the electrical system toward meeting an objective for economical optimization of the electrical system during an upcoming time domain. The output control variables are the ESS power command (ESS_command) and the photovoltaic limit (PV_limit), which are output to the building electrical system to command an ESS and a photovoltaic subsystem.

The presently applicable $P_{nom}$, UB, $UB_0$, and LB are extracted 802 from $X_{opt}$. The ESS power command, ESS_command, is set 804 equal to $P_{nom}$. The photovoltaic limit, PV_limit, is set 806 equal to PV maximum power, PV_max_power. The building power, P_building, is calculated 808 as a summation of the unadjusted building load, the photovoltaic limit, and the ESS power command (P_building=Load+PV_limit+ESS_command).

A determination 810 is made whether the building power is greater than $UB_0$ (P_building>$UB_0$) and whether the ESS command is greater than zero (ESS_command>0). If yes, then variables are set 812 as:

ESS_command=$UB_0$−Load−PV_limit

P_building=Load+PV_limit+ESS_command.

After the determination 810, in some embodiments, if the ESS_command is changed from charging to discharging the HSC may set ESS_command to zero.

A determination 814 is made whether building power is greater than UB (P_building>UB). If yes, then variables are set 816 as:

ESS_command=UB−Load−PV_limit

P_building=Load+PV_limit+ESS_command.

A determination 818 is made whether building power is less than LB (P_building<LB). If yes, then variables are set 820 as:

ESS_command=UB−Load−PV_limit

P_building=Load+PV_limit+ESS_command.

and another determination 822 is made whether building power remains less than LB (P_building<LB). If yes, then the photovoltaic limit PV_limit is set 824 as:

PV_limit+(LB−P_building).

In some embodiments, the HSC may check that the ESS_command is set between a maximum discharge rate and a maximum charge rate. For example, the HSC may limit the ESS_command based on an inverter capability of the ESS.

Then the control variables ESS_command and PV_limit are output 830 to the electrical system.

An Example HSC Result

Figure 9:
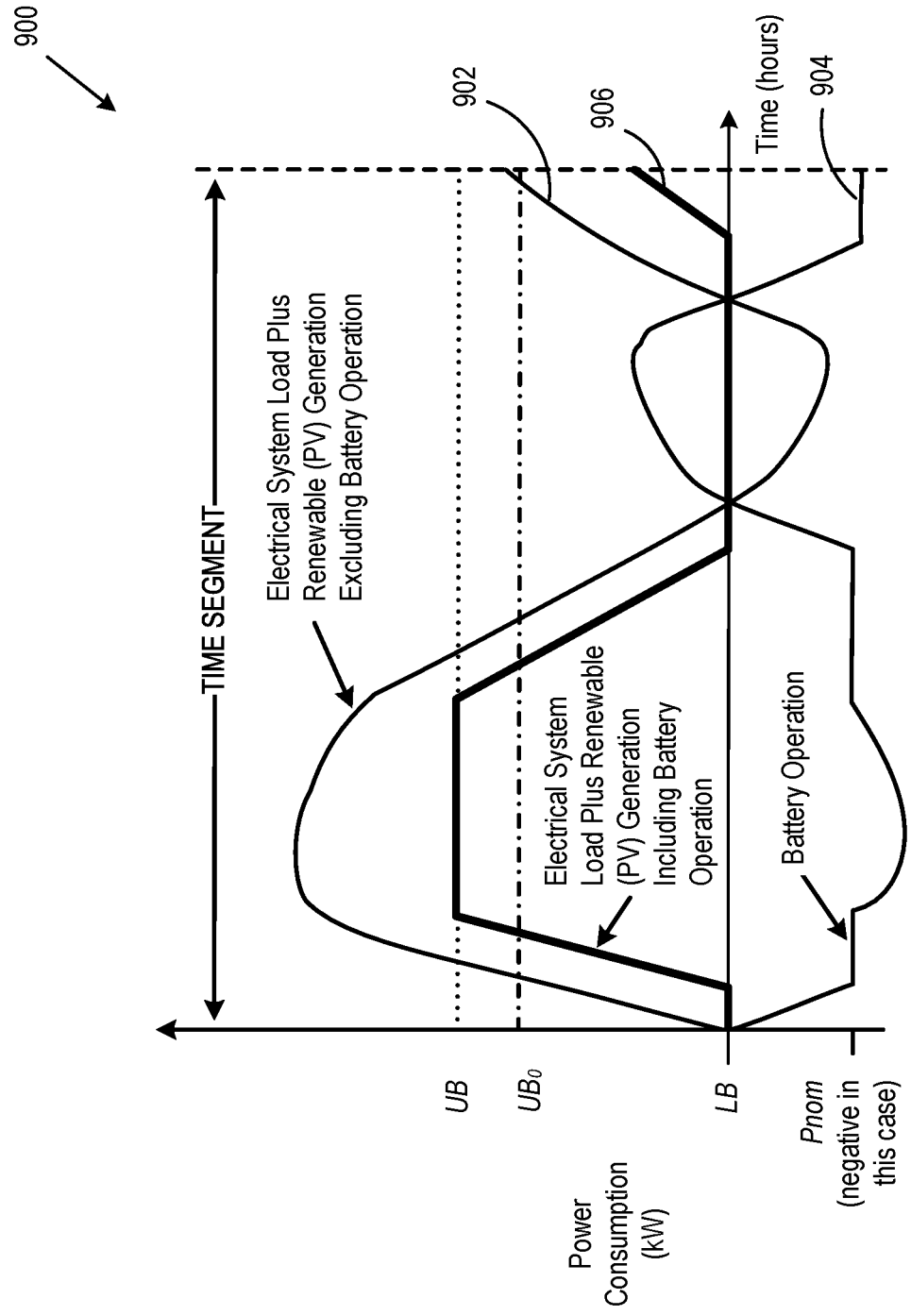
FIG. 9 is a graph showing plots for an example of application of a particular four-parameter control parameter set during a time segment.

FIG. 9 is a graph 900 showing plots for an example of application of a particular four-parameter control parameter set during a time segment. The graph 900 shows a value for each of UB, $UB_0$, LB, and $P_{nom}$, which are defined above in Table 1. A vertical axis is the power consumption (or rate of energy consumed), with negative values being generative. A first plot 902 provides unadjusted values of power consumption (kW) for the electrical system load plus renewable (photovoltaic) generation and excluding battery operation, over the time segment. In other words, the first plot 902 shows operation of the electrical system without benefit of a controllable ESS (battery) that is controlled by a controller, according to the present disclosure. A second plot 904 provides values of power consumption (kW) for battery operation over the time segment. The second plot 904 may reflect operation of an ESS as commanded by the controller. In other words, the second plot 904 is the control variable for the ESS. The battery operation value may be the value of the control variable to be provided by the HSC to command operation of the ESS. A third plot 906 provides values of power consumption (kW) for the electrical system load plus renewable (photovoltaic) generation and including battery operation, over the time segment. The third plot 906 illustrates how the controlled ESS (or battery) affects the power consumption of the electrical system from the grid. Specifically, the battery in this example is controlled (e.g., by the battery operation value) to discharge to reduce the load of the electrical system on the grid and limit peak demand to the UB value when desired. Furthermore, this example shows LB being enforced by commanding the ESS to charge by an amount that limits the adjusted net power to be no less than LB when necessary. Furthermore, this example shows that the nominal ESS power (Pnom) is commanded to the extent possible while still meeting the requirements of UB, $UB_0$, and LB.

In other embodiments, the control parameter set X may have fewer or more parameters than the four described for the example embodiment above. For example, the control parameter set X may be comprised of only three parameters: Pnom, UB, and LB. Alternately, the control parameter set X may be comprised of only two parameters: Pnom and UB. Alternately, the control parameter set X may include only of UB or only of Pnom. Or, it may include any other combination of four or fewer parameters from the above list.

Figure 10:
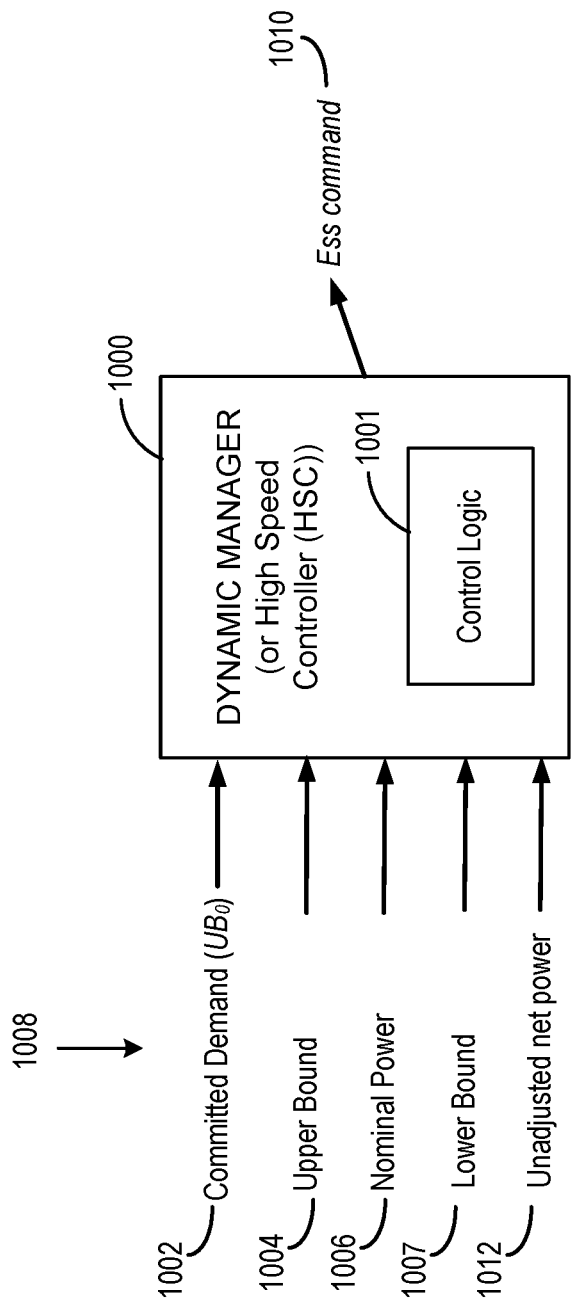
FIG. 10 is a diagrammatic representation of a dynamic manager (or high speed controller (HSC)) that utilizes or otherwise implements an control logic to determine control variables (including ESS_command) for controlling one or more components of the electrical system at the current time based on a control parameter set X.

FIG. 10 is a diagrammatic representation of a dynamic manager 1000 (or high speed controller (HSC)) that utilizes or otherwise implements an control logic 1001 to determine control variables (including ESS_command 1010) for controlling one or more components of the electrical system at the current time based on a control parameter set X 1008. While the illustrated embodiment shows only the ESS_command 1010, the control variables may include additional variables such as variables to control one or more generators or one or more loads. The dynamic manager 1000 is a rules-based control subsystem for a battery operating on an electric grid. In some embodiments, the control parameter set X 1008 may be an optimized control parameter set $X_{opt}$.

The control parameter set X 1008 may include several components including $P_{nom}$ 1006, UB 1004, $UB_0$ 1002, and LB 1007. Each of these components is a vector of power values. A vector of power values includes a set of values to be applied at different periods of time. Together, the components of the control parameter set X 1008 make up a control vector.

The $P_{nom}$ 1006 is nominal ESS power (or discharge power if negative) to be applied in the absence of other constraints or rules (such as those related to UB 1004, $UB_0$ 1002, or LB). In the illustrated embodiment, $P_{nom}$ 1006 represents a battery command if no other limitations are violated. The $P_{nom}$ 1006 may be an output of an optimization process. Each of the other components of the control vector (i.e., control parameter set X 1008) represent limitations.

The LB 1007 represents a lower bound that the adjusted net power of the electrical system will be kept above unless the ESS is incapable of charging at sufficient power and generators cannot be throttled sufficiently. For example, suppose a load, battery, and solar system were tied together behind a single meter. A utility may put a constraint on the electrical system that no power can be exported to the grid. With that restriction the dynamic manager 1000, the LB 1007 may be set to 0 kW, and the dynamic manager 1000 may prevent exporting power to the grid. A utility could also specify that only X kW could be exported, and the LB 1007 would be set at −X kW. The utility could also specify that the total load behind the meter had to stay above Y kW and the LB 1007 would be set to Y kW.

The UB 1004 is an upper bound on adjusted demand (e.g., an upper setpoint) that is not to be exceeded unless the ESS is incapable of discharging at sufficient power. The UB 1004 may be an output of an optimization process, The UB 1004 may represent the forecasted optimum Committed Demand. The UB 1004 is what is thought the Committed Demand will be in the future at a specific point in time.

The $UB_0$ 1002 is an upper bound on electrical system adjusted demand (e.g., an upper setpoint) not to be actively exceeded (e.g., electrical system adjusted demand may exceed this value only with ESS power less than or equal to 0). Actively exceeding a value occurs when the ESS is allowed to charge past that value. Thus, $UB_0$ 1002 defines a point beyond which the ESS is not permitted to charge. The $UB_0$ 1002 may be set to a previously established committed demand. The committed demand or $UB_0$ 1002 typically represents the historical maximum power measured during a demand period. The committed demand is calculated based off of a Demand Calculation Interval (DCI). The DCI is a specific time interval during which a utility will calculate peak power over. This can vary by utility and tariff. For example, some DCIs are 30 minutes while some DCIs are 15 minutes. There is one maximum power measurement (MPM) per demand rate within a tariff. If multiple rates are applicable at a specific time, the Committed Demand is the minimum of the MPMs.

The dynamic manager 1000 receives the control parameter set X and a measurement of the electrical system (e.g., unadjusted net power 1012), and outputs the control variables, such as a battery power command (e.g., ESS_command 1010). To determine the ESS_command 1010, the dynamic manager 1000 applies the control logic 1001 to the control parameter set X 1008. The control logic 1001 sets the ESS_command 1010 based on the total load (e.g., unadjusted net power 1012), $P_{nom}$ 1006, UB 1004, $UB_0$ 1002 and, LB 1007. The total load (in the case of determining the ESS_command) refers to the power used by all loads offset by the power produced by all generators, and excluding power discharged or consumed by the battery. The control logic 1001 may set the ESS_command 1010 based on the following conditions.

1. If no bounds (e.g., UB 1004, $UB_0$ 1002 and, LB 1007) are violated by adding the $P_{nom}$ 1006 to the total load, the ESS_command 1010 is set to the $P_{nom}$ 1006.
2. If adding the $P_{nom}$ 1006 to the total load violates the LB 1007, then the ESS_command 1010 is set to a charge command such that the LB 1007 is reached.
3. If adding the $P_{nom}$ 1006 to the total load violates the UB 1004, then the ESS_command 1010 is set to a discharge command (e.g., negative value) such that the UB 1004 is reached.
4. If the $P_{nom}$ 1006 is a charge command (e.g. positive value), and if adding the $P_{nom}$ 1006 to the total load violates the $UB_0$ 1002, then the ESS_command 1010 is set to a charge command such that the $UB_0$ 1002 is reached.
5. If none of the above if statements are true (e.g., the conditions specified above are not met), and if adding the $P_{nom}$ 1006 to the total load would result in a value higher than the committed demand but lower than the upper bound, ESS_command 1010 is set to zero.

Additionally, in some embodiments the ESS_command 1010 is limited by the inverter capability. Accordingly, the dynamic manager 1000 may place limits on the range of the ESS_command 1010. The above logic is represented in a flow diagram form in FIG. 8.

Note in the above logic that the fourth conditional if statement adds a level of risk-aversion to the ruleset. As established previously, Committed Demand ($UB_0$ 1002) represents the historical maximum of a demand period. Although the optimization output is the UB 1004, and therefore what the system mathematically expects the committed demand to be during the future time period, the UB 1004 is based on a load forecast which may be flawed. Specifically, if the load forecast is high, a high Upper Bound will be established (e.g., higher than the committed demand ($UB_0$ 1002)). If the load does not actually get as high as forecasted during a period with a charge command ($P_{nom}$>0), the total load will not exceed the committed demand and therefore a new, higher committed demand (which would be more economically costly) would not have been established.

It is possible that without this fourth step, the ESS_command 1010 could be such that the battery charges up to the UB 1004 increasing the committed demand to a new higher committed demand. The fourth step of the control logic 1001 prevents the ESS_command 1010 from increasing the adjusted net power past the $UB_0$ 1002 (e.g., committed demand).

The control logic 1001 can be implemented in software, hardware, firmware, or any combination of these. The control logic 1001 may be implemented based on any approach from descriptions in literature, pre-written code, or developed from first principles. The control logic 1001 implementation can also be tailored to the specific problem of electrical system economic optimization, as appropriate in some embodiments.

Figure 11:
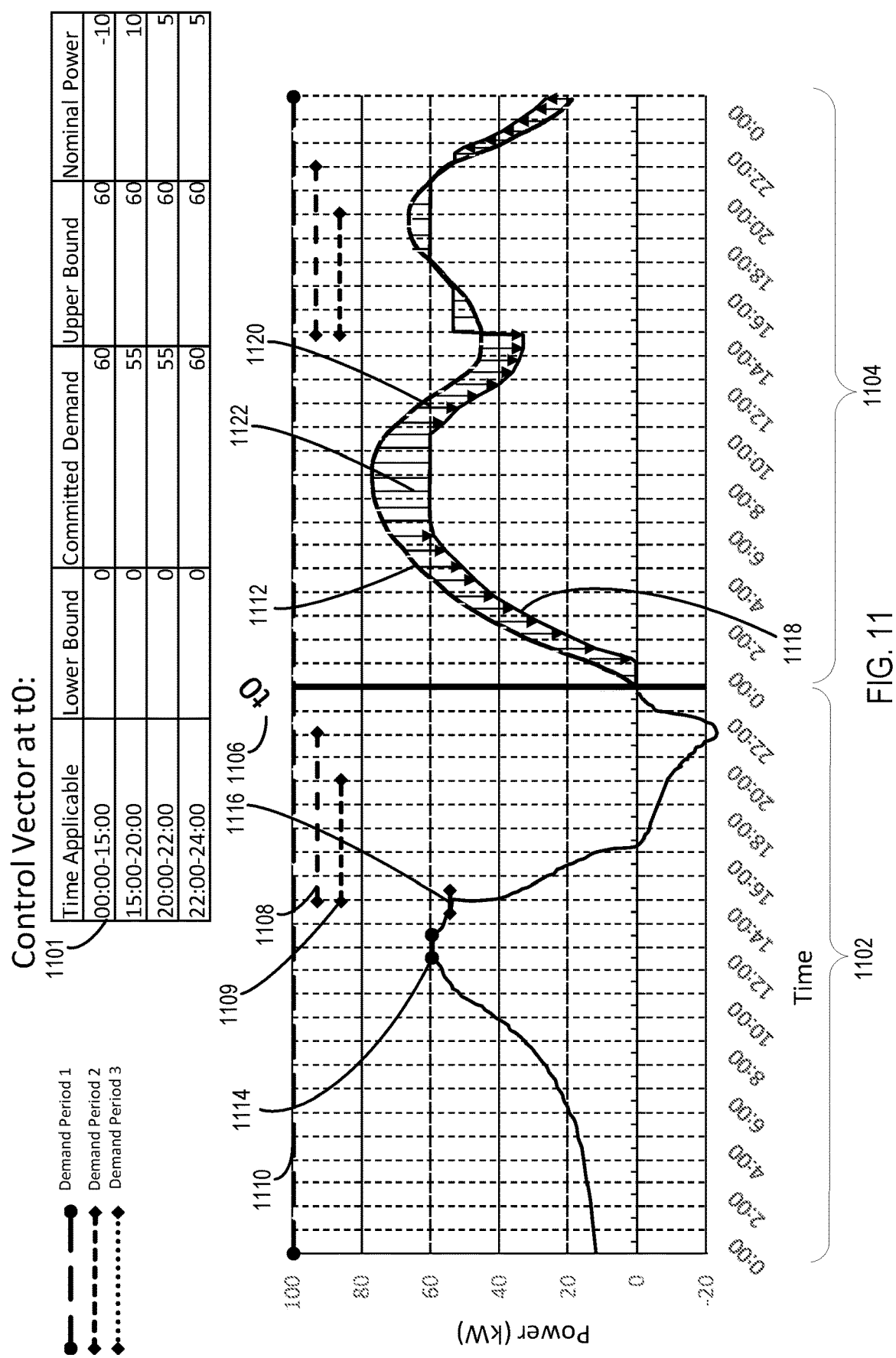
FIG. 11 illustrates a graph of committed demand being calculated.
Figure 12:
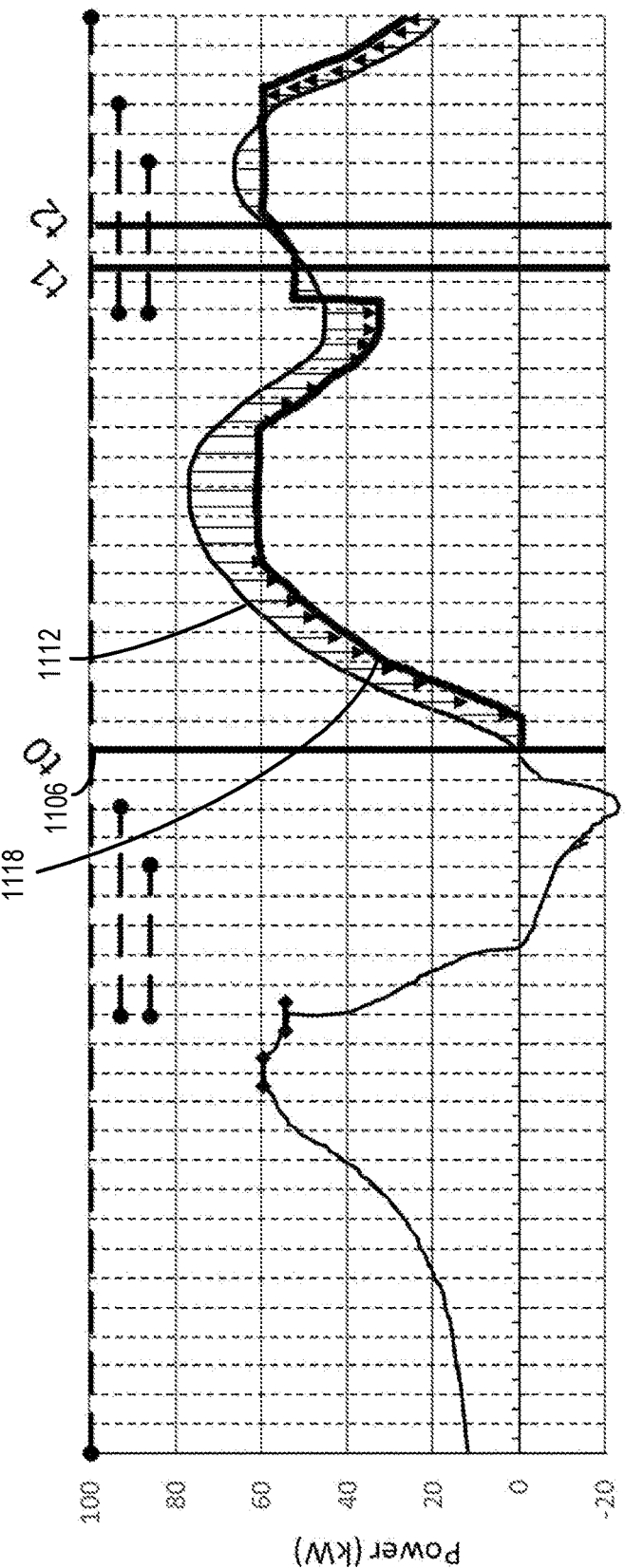
FIG. 12 illustrates a graph of a dynamic manager that updates or receives an updated control vector.

FIGS. 11 and 12 are graphs illustrating examples of the dynamic manager (or high speed controller (HSC)) applying control logic to a set of control variables (e.g., control vector 1101) to effectuate a change to one or more components of an electrical system. The graphs illustrate a dynamic manager applying the logic detailed in relation to FIG. 10 to adjust the control vector 1101 to adjust an ESS_command as the unadjusted net power 1112 of the electrical system changes.

In the illustrated embodiments, the control vector 1101 includes a lower bound LB, an upper bound UB, a committed demand (i.e., Upper bound on electrical system adjusted demand not to be actively exceeded $UB_0$), and nominal ESS power $P_{nom}$ to be applied during a future time domain. The dynamic manager may receive all or part of the values of the control vector 1101 from an economic optimizer.

In the examples, each of the above listed inputs—Lower Bound, Committed Demand, Nominal Power, and Upper Bound—are vectors representing power applicable for a time, with each sequential value in the vector representing a power applicable at a time later than the previous value.

In FIG. 11, committed demand is determined prior to time t0 1106 (e.g., previous time segment 1102). The committed demand, also referred to herein as $UB_0$, typically represents the historical maximum power measured during a demand period. In the illustrated embodiment, there are two committed demands. A first committed demand 1114 represents the historical maximum during a first demand period 1110.

A second committed demand 1116 represents the historical maximum during a period of time where the first demand period 1110, a second demand period 1108, and a third demand period 1109 overlap. The committed demand is determined for stacked or overlapping demand periods where potentially each demand period has a different rate. The third demand period 1109 occurs at a subset of time within the second demand period 1110, which occurs at a subset of time within the first demand period 1110.

In one example, the DCI is 1 hour. FIG. 11 illustrates how committed demand also referred to herein as $UB_0$ may be calculated. The adjusted net power 1118 during the previous time segment 1102 may be determined by the dynamic manager or the EO. The MPM for each of the previous listed demand periods is calculated as illustrated graphically. The MPM is the maximum of all of the one hour averages of the load. In the illustrated embodiment, the MPMs of the second demand period 1108 and the third demand period 1109 are the same value (55 kW), because 55 kW was the maximum hour-average load during the time the demand periods were active. In the illustrated embodiment, the MPM of the first demand period 1110 is 60 kW as the load average was higher during this time.

Committed demand may be 60 kW when only the first demand period 1110 is active (e.g., at times 00:00 to 15:00 and 22:00 to 24:00). When the first demand period 1110 and the second demand period 1108 are active, the dynamic manager may determine the committed demand by calculating the minimum of the MPMs of each demand period. As the MPM of the first demand period 1110 is 60 kW and the MPM of the second demand period 1108 is 55 kW, the committed demand from 20:00 to 22:00 would be 55 kW. When all three demand periods are active, from 15:00 to 20:00, again the committed demand is the minimum of the MPMs, which in this case is again 55 kW.

The dynamic manager applies the control vector 1101 determined at time t0 1106 to an electricity load during a future time period 1104. As illustrated, the future time period 1104 may be a 24 hour period. The control vector 1101 is illustrated in FIG. 11 as a table. The graph illustrates the adjusted net power 1118 (i.e., the sum of the unadjusted net power of the electrical system and the ESS_command) and the unadjusted net power 1112 during the future time period 1104.

The vertical lines between the adjusted net power 1118 and the unadjusted net power 1112 represent the ESS_command. The vertical lines with arrow heads (e.g., arrow 1120) represent when the dynamic manager sets the ESS_command to the nominal power. The vertical lines without arrow heads (e.g., line 1122) represent when the dynamic manager follows another rule that overrides and sets the ESS_command to a value that is different than the nominal ESS power.

For example, between 0:00 and 1:00 the dynamic manager sums the nominal ESS power (−10 kW) and the current unadjusted net power 1112 and determines that the nominal ESS power would cause the lower bound (0 kW) to be violated. Accordingly, the dynamic manager may set the ESS_command to a value that does not cause the adjusted net power 1118 to violate the lower bound such as the lower bound minus the unadjusted net power.

Between 1:00 and 7:00, using the nominal ESS power (−10 kW) does not violate any bounds. Therefore, the dynamic manager may set the ESS_command to nominal ESS power during this period of time.

Between 7:00 and 10:30, the dynamic manager determines that adding the nominal ESS power (−10 kW) to the unadjusted net power 1112 would violate the upper bound. Accordingly, the dynamic manager may set the ESS_command to a value that does not cause the adjusted net power 1118 to violate the upper bound such as the upper bound minus the unadjusted net power.

Between 10:30 and 15:00, the dynamic manager determines that adding the nominal ESS power (−10 kW) to the unadjusted net power 1112 does not violate any bounds. Therefore, the dynamic manager may set the ESS_command to nominal ESS power during this period of time.

The nominal ESS power changes at 15:00 to 10 kW. From 15:00 to 17:00, the dynamic manager determines that the nominal ESS power is a charge command (e.g. positive value), and that adding the nominal ESS power to the unadjusted net power 1112 would violate the committed demand (55 kW). Accordingly, the dynamic manager sets the ESS_command to a charge command such that the committed demand is not violated. For example, the ESS_command may be set to a value such that the committed demand is reached.

From 17:00 to 18:00, the dynamic manager determines that adding the nominal ESS power to the unadjusted net power 1112 would result in the adjusted load value (i.e., adjusted net power 1118) being higher than the committed demand but lower than the upper bound. Accordingly, the dynamic manager may set the ESS_command to zero so that the committed demand is not actively exceeded, but may be non-actively exceeded should the load rise.

From 18:00 to 21:00, the dynamic manager determines that adding the nominal ESS power (initially 10 kW, and then 5 kW at 20:00) to the unadjusted net power 1112 would violate the upper bound (60 kW). Accordingly, the dynamic manager may set the ESS_command to a value that causes the adjusted net power 1118 to be at or below the upper bound such as the upper bound minus the unadjusted net power.

From 21:00 to 22:00, the dynamic manager determines that adding the nominal ESS power (5 kW) to the unadjusted net power 1112 would result in a value higher than the committed demand but lower than the upper bound. Accordingly, the dynamic manager may set the ESS_command to zero so that the committed demand is not actively exceeded.

From 22:00 to 0:00, the dynamic manager determines that using the nominal ESS power (5 kW) does not violate any bounds. Therefore, the dynamic manager may set the ESS_command to nominal ESS power during this period of time.

FIG. 12 illustrates a graph illustrating a dynamic manager that updates or receives an updated control vector 1201. As in FIG. 11, the dynamic manager applies the control vector 1101 after time t0 1106. However, in the embodiment illustrated in FIG. 12, the dynamic manager updates or receives an updated control vector at every timestamp. The update could occur every minute, 10 minutes, 30 minutes, hour, or after each time segment in the control vector 1101.

In some embodiments, the economic optimizer (EO) outputs at each time stamp an identical Upper Bound and Nominal Power, but the Committed Demand—a calculated value—is updated. FIG. 12 looks similar to FIG. 11 except after timestamp 20:00. After timestamp 20:00 the updated control vector increases the committed demand from 55 kW to 60 kW because the adjusted net power 1118 exceeded committed demand between t1 and t2. Accordingly, when the committed demand is calculated at t2 the committed demand is higher than at t0 (changes from 55 kW to 60 kW because the adjusted load's MPM is 60 kW at t2 in all three active demand periods). Therefore, after t2, the ESS_command is allowed to be set to charge the ESS to a value that causes the adjusted net power 1118 to be up to the new Committed Demand (60 kW).

Apparatus Architectures

Figure 13:
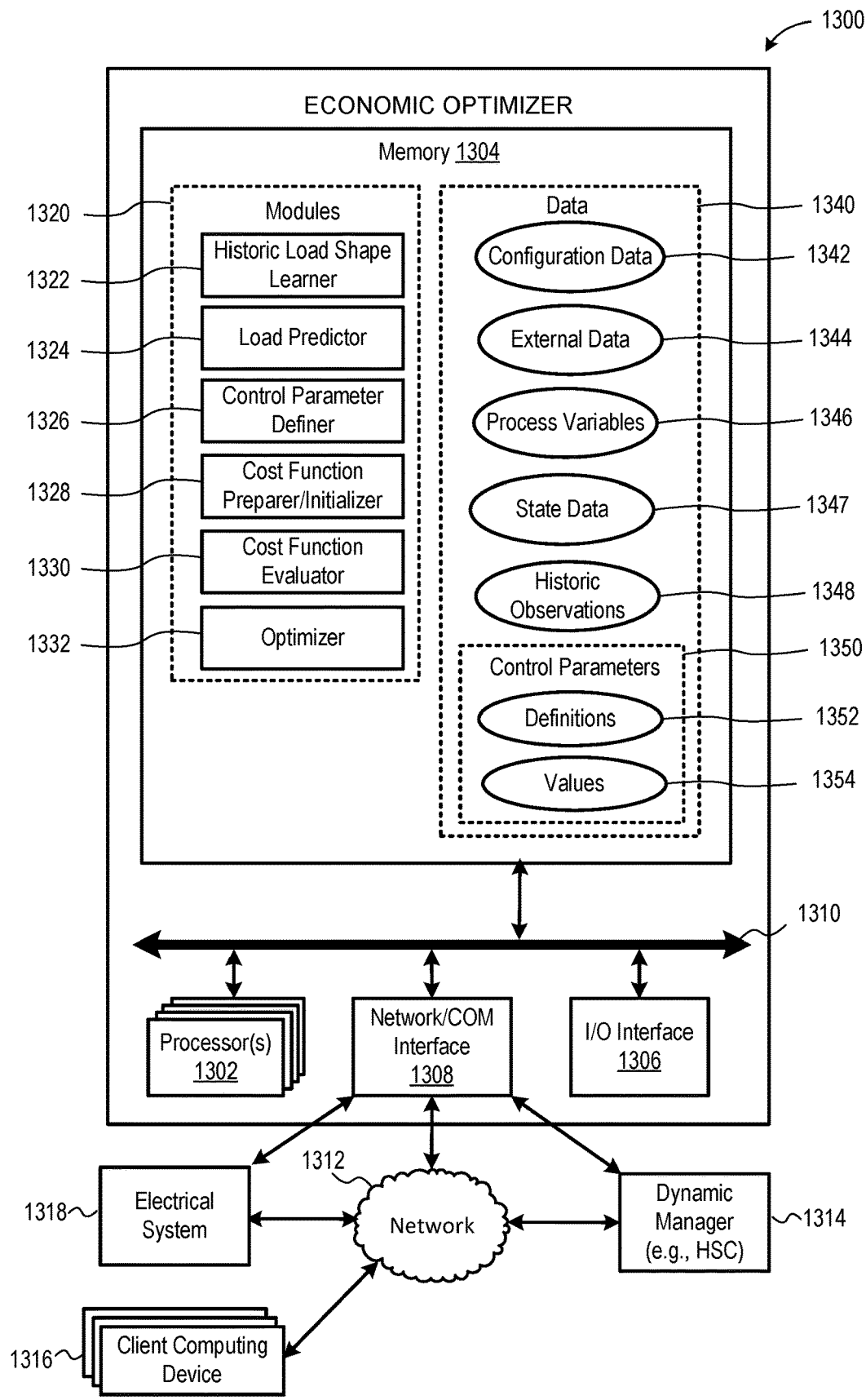
FIG. 13 is a diagram of an economic optimizer, according to one embodiment of the present disclosure.

FIG. 13 is a diagram of an EO 1300 according to one embodiment of the present disclosure. The EO 1300 may determine a control plan for managing control of an electrical system 1318 during an upcoming time domain and provide the control plan as output. The determined control plan may include a plurality of sets of parameters each to be applied for a different time segment within an upcoming time domain. The EO 1300 may determine the control plan based on a set of configuration elements specifying one or more constraints of the electrical system 1318 and defining one or more cost elements associated with operation of the electrical system. The EO 1300 may also determine the control plan based on a set of process variables that provide one or more measurements of a state of the electrical system 1318. The EO 1300 may include one or more processors 1302, memory 1304, an input/output interface 1306, a network/COM interface 1308, and a system bus 1310.

The one or more processors 1302 may include one or more general purpose devices, such as an Intel®, AMD®, or other standard microprocessor. The one or more processors 1302 may include a special purpose processing device, such as ASIC, SoC, SiP, FPGA, PAL, PLA, FPLA, PLD, or other customized or programmable device. The one or more processors 1302 perform distributed (e.g., parallel) processing to execute or otherwise implement functionalities of the present embodiments. The one or more processors 1302 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 1304 may include static RAM, dynamic RAM, flash memory, one or more flip-flops, ROM, CD-ROM, DVD, disk, tape, or magnetic, optical, or other computer storage medium. The memory 1304 may include a plurality of program modules 1320 and a data 1340.

The program modules 1320 may include all or portions of other elements of the EO 1300. The program modules 1320 may run multiple operations concurrently or in parallel by or on the one or more processors 1302. In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor and/or computing device, cause a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, subsystems and/or the like.

The system memory 1304 may also include the data 1340. Data generated by the EO 1300, such as by the program modules 1320 or other modules, may be stored on the system memory 1304, for example, as stored program data 1340. The data 1340 may be organized as one or more databases.

The input/output interface 1306 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network/COM interface 1308 may facilitate communication or other interaction with other computing devices (e.g., a dynamic manager 1314) and/or networks 1312, such as the Internet and/or other computing and/or communications networks. The network/COM interface 1308 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network/COM interface 1308 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth. The network/COM interface 1308 may be any appropriate communication interface for communicating with other systems and/or devices.

The system bus 1310 may facilitate communication and/or interaction between the other components of the system, including the one or more processors 1302, the memory 1304, the input/output interface 1306, and the network/COM interface 1308.

The modules 1320 may include a historic load shape learner 1322, a load predictor 1324, a control parameter definer 1326, a cost function preparer/initializer 1328, a cost function evaluator 1330, and an optimizer 1332.

The historic load shape learner 1322 may compile or otherwise gather historic trends to determine a historic profile or an average load shape that may be used for load prediction. The historic load shape learner 1322 may determine and update and an avg_load_shape array and an avg_load_shape_time_of_day array by recording load observations and using an approach to determine a suitable average of the historic load observations after multiple periods of time. The historic load shape learner 1322 may utilize a process or an approach to determining the historic average profile such as described above with reference to FIG. 8.

The load predictor 1324 may predict a load on the electrical system 1318 during an upcoming time domain. The load predictor 1324 may utilize a historic profile or historic load observations provided by the historic load shape learner 1322. The load predictor 1324 may utilize a load prediction method.

The control parameter definer 1326 may generate, create, or otherwise define a control parameter set X, in accordance with a control law. The created control parameters 1350 may include a definition 1352 and a value 1354 and may be stored as data 1340.

The cost function preparer/initializer 1328 prepares or otherwise obtains a cost function to operate on the control parameter set X. The cost function may include the one or more constraints and the one or more cost elements associated with operation of the electrical system 1318. The cost function preparer/initializer 1328 pre-calculates certain values that may be used during iterative evaluation of the cost function involved with optimization.

The cost function evaluator 1330 evaluates the cost function based on the control parameter set X. Evaluating the cost function simulates operation of the electrical system for a given time period under a given set of circumstances set forth in the control parameter set X and returns a cost of operating the electrical system during the given time period.

The optimizer 1328 may execute a minimization of the cost function by utilizing an optimization algorithm to find the set of values for the set of control variables. Optimization (e.g., minimization) of the cost function may include iteratively utilizing the cost function evaluator 1330 to evaluate the cost function with different sets of values for a control parameter set X until a minimum cost is determined. In other words, the algorithm may iteratively change values for the control parameter set X to identify an optimal set of values in accordance with one or more constraints and one or more cost elements associated with operation of the electrical system.

The data 1340 may include configuration data 1342, external data 1344, process variables 1346, state data 1347, historic observations 1348, and control parameters 1350 (including definitions 1352 and values 1354).

The configuration data 1342 may be provided to, and received by, the EO 1300 to communicate constraints and characteristics of the electrical system 1318.

The external data 1344 may be received as external input (e.g., weather reports, changing tariffs, fuel costs, event data), which may inform the determination of the optimal set of values.

The process variables 1346 may be received as feedback from the electrical system 1318. The process variables 1346 are typically measurements of the electrical system 1318 state and are used to, among other things, determine how well objectives of controlling the electrical system 1318 are being met.

The state data 1347 would be any EO state information that may be helpful to be retained between one EO iteration and the next. An example is avg_load_shape.

The historic observations 1348 are the record of process variables that have been received. A good example is the set of historic load observations that may be useful in a load predictor algorithm.

As noted earlier, the control parameter definer may create control parameters 1350, which may include a definition 1352 and a value 1354 and may be stored as data 1340. The cost function evaluator 1330 and/or the optimizer 1332 can determine values 1354 for the control parameters 1350.

The EO 1300 may provide one or more control parameters 1350 as a control parameter set X to the dynamic manager 1314 via the network/COM interface 1308 and/or via the network 1312. The dynamic manager 1314 may then utilize the control parameter set X to determine values for a set of control variables to deliver to the electrical system 1318 to effectuate a change to the electrical system 1318 toward meeting one or more objectives (e.g., economic optimization) for controlling the electrical system 1318.

In other embodiments, the EO 1300 may communicate the control parameter set X directly to the electrical system 1318 via the network/COM interface 1308 and/or via the network 1312. In such embodiments, the electrical system 1318 may process the control parameter set X directly to determine control commands, and the dynamic manager 1314 may not be included.

In still other embodiments, the EO 1300 may determine values for a set of control variables (rather than for a control parameter set X) and may communicate the set of values for the control variables directly to the electrical system 1318 via the network/COM interface 1308 and/or via the network 1312.

One or more client computing devices 1316 may be coupled via the network 1312 and may be used to configure, provide inputs, or the like to the EO 1300, the dynamic manager 1314, and/or the electrical system 1318.

Figure 14:
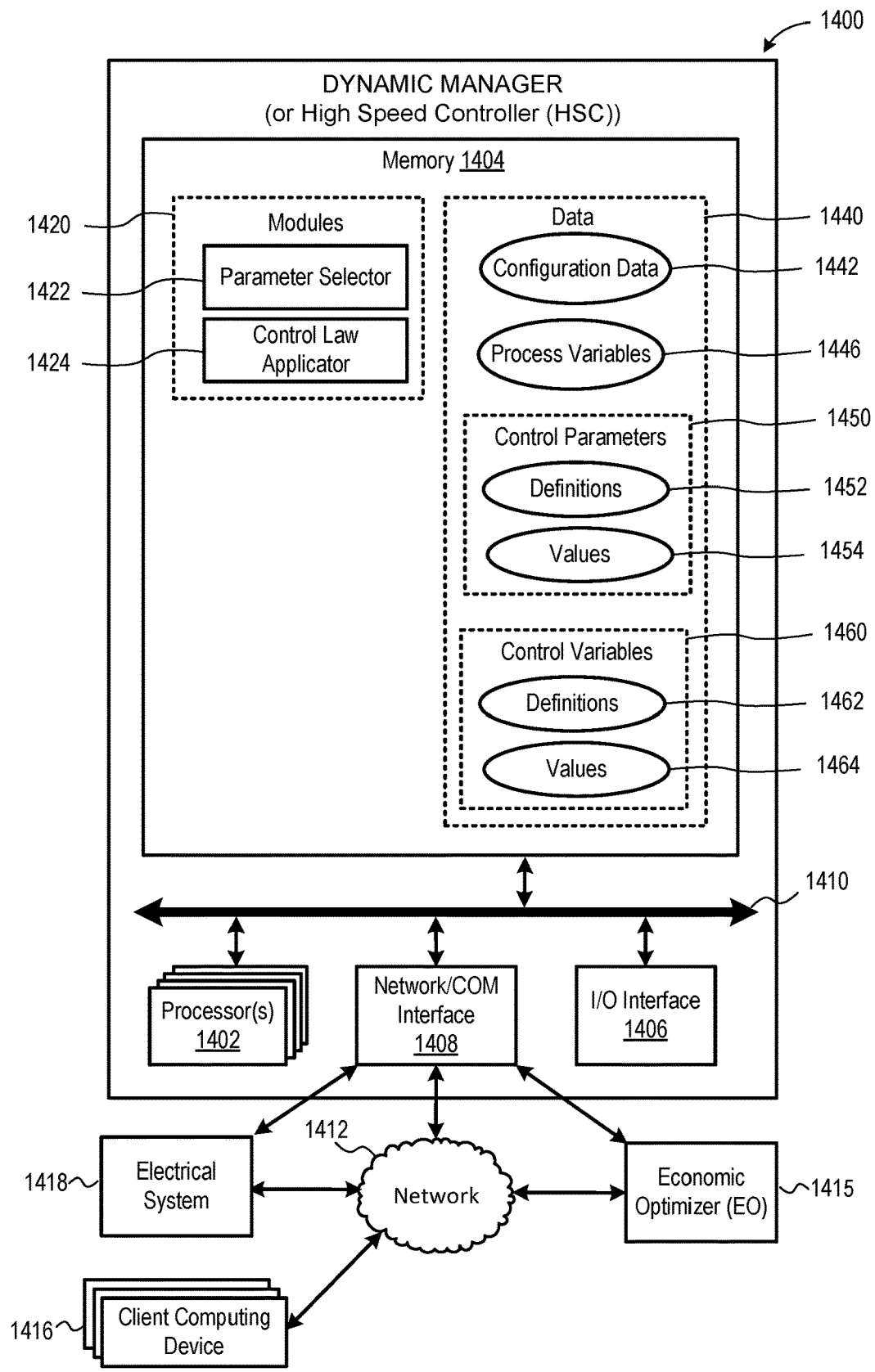
FIG. 14 is a diagram of a dynamic manager, according to one embodiment of the present disclosure.

FIG. 14 is a diagram of a dynamic manager 1400, according to one embodiment of the present disclosure. The dynamic manager 1400, according to one embodiment of the present disclosure, is a second computing device that is separate from an EO 1415, which may be similar to the EO 1300 of FIG. 13. The dynamic manager 1400 may operate based on input (e.g., a control parameter set X) received from the EO 1415. The dynamic manager 1400 may determine a set of control values for a set of control variables for a given time segment of the upcoming time domain and provide the set of control values to an electrical system 1418 to effectuate a change to the electrical system 1418 toward meeting an objective (e.g., economical optimization) of the electrical system 1418 during an upcoming time domain. The dynamic manager 1400 determines the set of control values based on a control law and a set of values for a given control parameter set X. The dynamic manager 1400 may include one or more processors 1402, memory 1404, an input/output interface 1406, a network/COM interface 1408, and a system bus 1410.

The one or more processors 1402 may include one or more general purpose devices, such as an Intel®, AMD®, or other standard microprocessor. The one or more processors 1402 may include a special purpose processing device, such as ASIC, SoC, SiP, FPGA, PAL, PLA, FPLA, PLD, or other customized or programmable device. The one or more processors 1402 perform distributed (e.g., parallel) processing to execute or otherwise implement functionalities of the present embodiments. The one or more processors 1402 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 1404 may include static RAM, dynamic RAM, flash memory, one or more flip-flops, ROM, CD-ROM, DVD, disk, tape, or magnetic, optical, or other computer storage medium. The memory 1404 may include a plurality of program modules 1420 and a program data 1440.

The program modules 1420 may include all or portions of other elements of the dynamic manager 1400. The program modules 1420 may run multiple operations concurrently or in parallel by or on the one or more processors 1402. In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor and/or computing device, cause a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, and/or the like.

The system memory 1404 may also include data 1440. Data generated by the dynamic manager 1400, such as by the program modules 1420 or other modules, may be stored on the system memory 1404, for example, as stored program data 1440. The stored program data 1440 may be organized as one or more databases.

The input/output interface 1406 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network/COM interface 1408 may facilitate communication with other computing devices and/or networks 1412, such as the Internet and/or other computing and/or communications networks. The network/COM interface 1408 may couple (e.g., electrically couple) to a communication path (e.g., direct or via the network) to the electrical system 1418. The network/COM interface 1408 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network/COM interface 1408 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 1410 may facilitate communication and/or interaction between the other components of the system, including the one or more processors 1402, the memory 1404, the input/output interface 1406, and the network/COM interface 1408.

The modules 1420 may include a parameter selector 1422 and a control law applicator 1424.

The parameter selector may pick which set of parameters to be used from the control parameter set X according to a given time segment.

The control law applicator 1424 may process the selected set of parameters from the control parameter set X and convert or translate the individual set of parameters into control variables (or values thereof). The control law applicator 1424 may apply logic and/or a translation process to determine a set of values for a set of control variables based on a given set of parameters (from a control parameter set X) for a corresponding time segment. For example, the control law applicator 1424 may apply a method and/or logic as shown in FIG. 8.

The data 1440 may include configuration data 1442, process variables 1446, control parameters 1450 (including definitions 1452 and values 1454), and/or control variables 1460 (including definitions 1462 and values 1464).

The configuration data 1442 may be provided to, and received by, the dynamic manager 1400 to communicate constraints and characteristics of the electrical system 1318.

The process variables 1446 may be received as feedback from the electrical system 1418. The process variables 1446 are typically measurements of the electrical system 1418 state and are used to, among other things, determine how well objectives of controlling the electrical system 1418 are being met. Historic process variables 1446 may be utilized by the HSL for example to calculate demand which may be calculated as average building power over the previous 15 or 30 minutes. The dynamic manager 1400 can determine the set of control values for the set of control variables based on the process variables 1446.

The control parameters 1450 may comprise a control parameter set X that includes one or more sets of parameters each for a corresponding time segment of an upcoming time domain. The control parameters 1450 may additionally, or alternately, provide a control plan for the upcoming time domain. The control parameters 1450 may be received from an EO 1415 as an optimal control parameter set $X_{opt}$.

The control variables 1460 may be generated by the parameter interpreter 1422 based on an optimal control parameter set $X_{opt}$.

The dynamic manager 1400 may receive the optimal control parameter set $X_{opt}$ from the EO 1415 via the network/COM interface 1408 and/or via the network 1412. The dynamic manager 1400 may also receive the process variables from the electrical system 1418 via the network/COM interface 1408 and/or via the network 1412.

The dynamic manager 1400 may provide the values for the set of control variables to the electrical system 1418 via the network/COM interface 1408 and/or via the network 1412.

One or more client computing devices 1416 may be coupled via the network 1412 and may be used to configure, provide inputs, or the like to the EO 1415, the dynamic manager 1400, and/or the electrical system 1418.

Example Cases of Energy Costs

Figure 15:
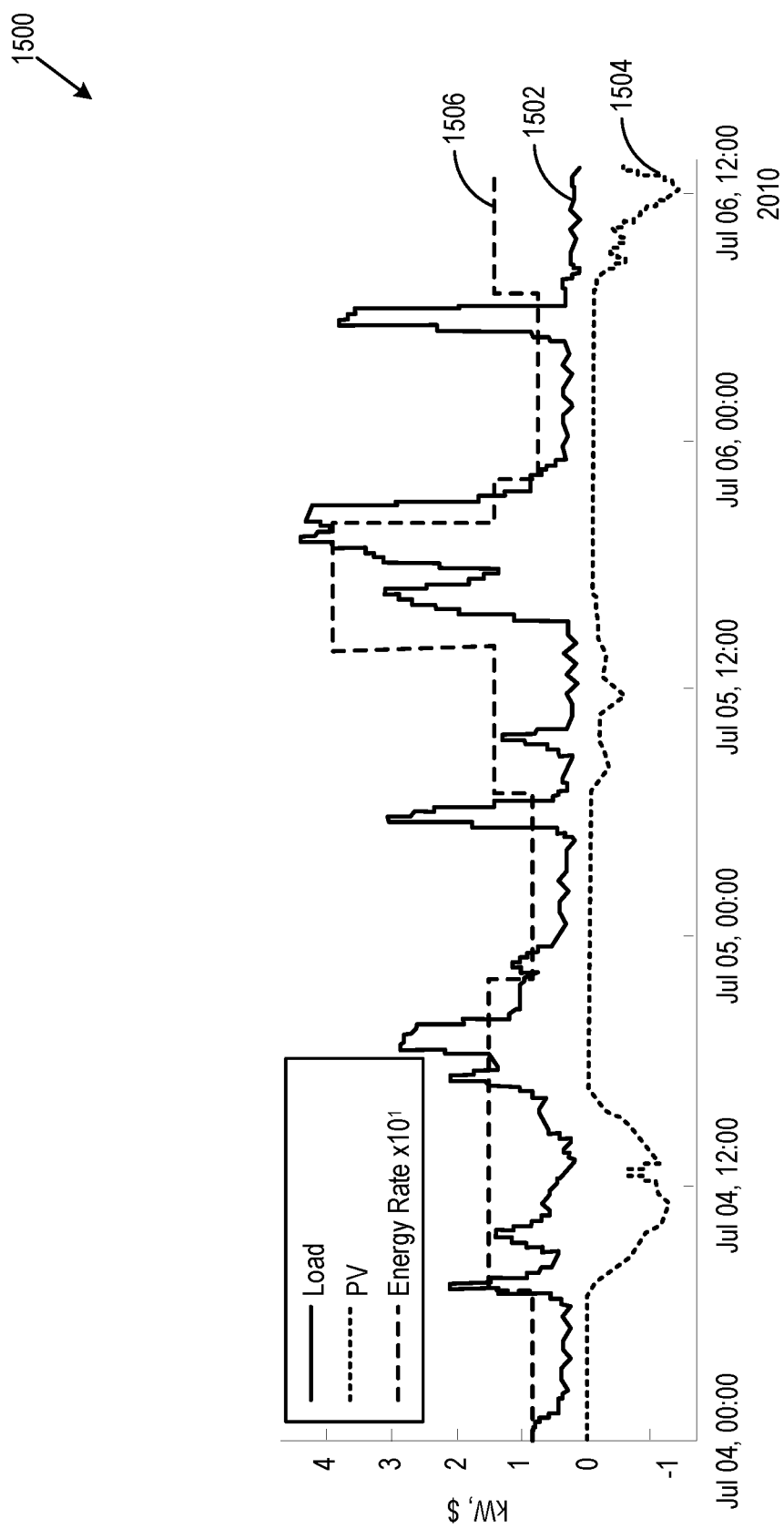
FIG. 15 is a graph illustrating how Time-of-Use (ToU) supply charges impact energy costs of a customer.

FIG. 15 is a graph 1500 illustrating how Time-of-Use (ToU) supply charges impact energy costs of a customer. ToU supply charges are time-specific charges customers pay for electrical energy consumed. The graph 1500 includes a plot 1502 of the load and a plot 1504 of a photovoltaic contribution. The graph 1500 includes a plot 1506 of ToU supply (or energy) rate. As can be seen in the illustrated example, ToU supply charges can vary by time of day, day of week, and season (summer vs. winter). ToU supply charges are calculated based on the NET energy consumed during specific meter read intervals (often 15 or 30 minutes). In the illustrated example, the supply rates are as follows:

Peak M-F 2 pm-8 pm $0.39/kWh,
Off-Peak 10 p-7 am $0.08/kWh,
Shoulder $0.15/kWh.

In the example, based on the load, the photovoltaic generation, and the supply rates, the Supply Charge on July 5 is approximately: 12.2*0.39+1.6*0.08+4.1*0.15=$5.50.

FIG. 16 is a graph 1600 illustrating how demand charges impact energy costs of a customer. Demand charges are electrical distribution charges that customers pay based on their maximum demand (kW) during a specified window of time. The graph 1600 includes a plot 1602 of the load and a plot 1604 of the demand. The graph 1600 also includes a plot 1606 of the demand rate. Demand charges are typically calculated monthly but can also be daily. The maximum is often only taken for certain hours of the day. In the illustrated embodiment, a daily demand rate from 8:00 am to 10:00 pm on weekdays is $0.84/kW (daily). The peak demand on May 21 is 416 kW. Accordingly the Demand Charge=416*0.84=$349.

Figure 17:
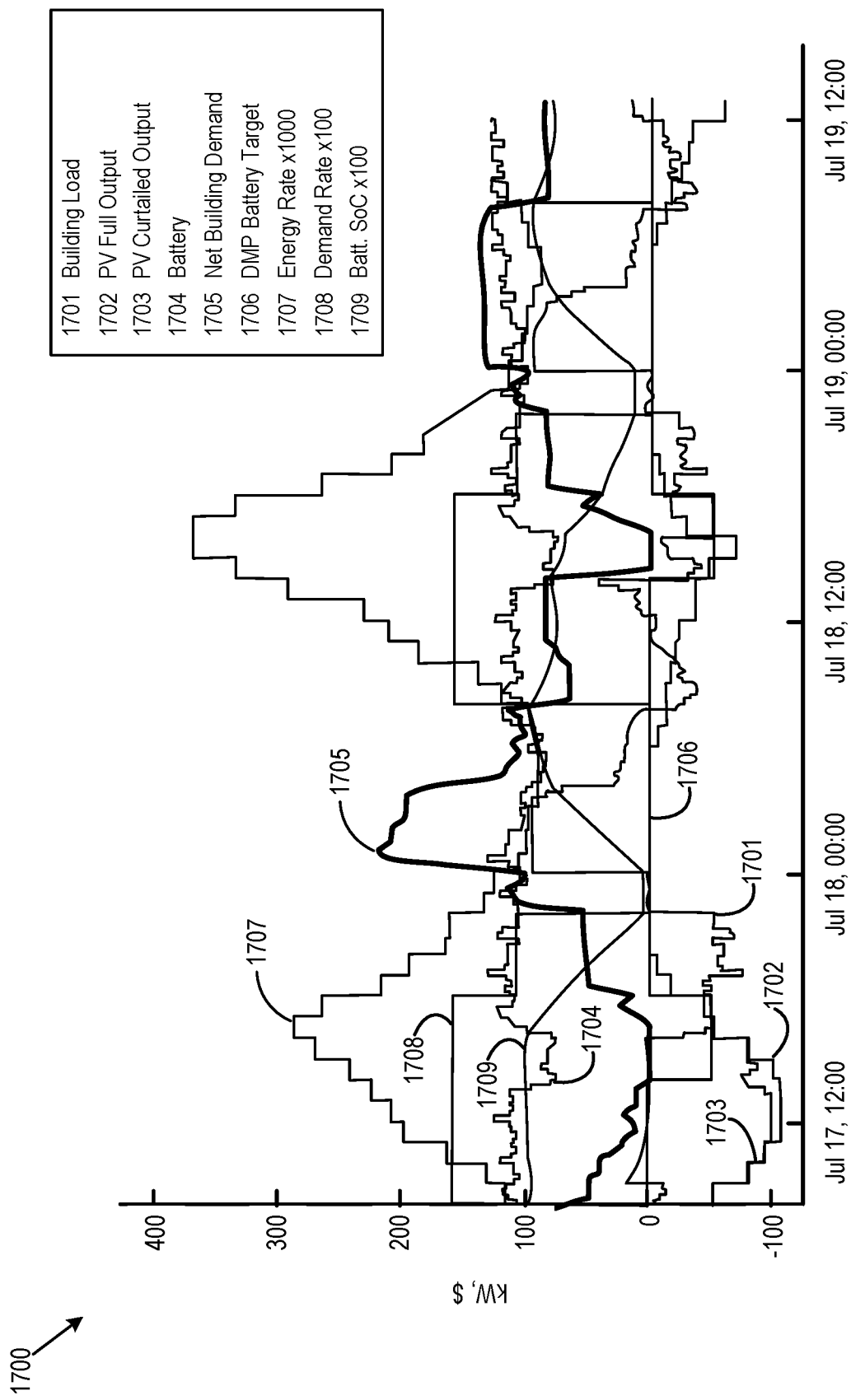
FIG. 17 is a graph illustrating the challenge of maximizing a customer's economic returns for a wide range of system configurations, building load profiles, and changing utility tariffs.

FIG. 17 is a graph 1700 illustrating the challenge of maximizing a customers' economic returns for a wide range of system configurations, building load profiles, and changing utility tariffs. The graph 1700 reflects consideration of a number of factors, including:

ToU Supply Charges (seasonal, hourly, for any number of time windows)
Demand Charges (daily, monthly, for any number of time windows)
Utilization of Renewable Generation (e.g., PV, CHP)
Contracted or Incentive Maneuvers (e.g., DMP and Demand Response)
Minimum Import Constraints
Battery Performance, Degradation Rate, and Cost.

The graph 1700 includes a plot 1701 for building load, a plot 1702 for PV full output, a plot 1703 for PV curtailed output, a plot 1704 for battery, a plot 1705 for net building demand, a plot 1706 for DMP battery power target, a plot 1707 for an energy supply rate (×1000), a plot 1708 for demand rate (×100), and a plot 1709 for the battery SoC (×100).

An EO according to one embodiment of the present disclosure optimizes overall energy economics by blending these factors (and any other factors) simultaneously in real time.

EXAMPLE EMBODIMENTS

The following are some example embodiments within the scope of the disclosure. In order to avoid complexity in providing the disclosure, not all of the examples listed below are separately and explicitly disclosed as having been contemplated herein as combinable with all of the others of the examples listed below and other embodiments disclosed hereinabove. Unless one of ordinary skill in the art would understand that these examples listed below (and the above disclosed embodiments) are not combinable, it is contemplated within the scope of the disclosure that such examples and embodiments are combinable.

Example 1

A controller to control an electrical system, the controller comprising: a communication interface to provide a communication path with an electrical system; and one or more processors to: receive a set of control parameters for a segment of an upcoming extended time period, the set of control parameters including a nominal energy storage system power ($P_{nom}$), an upper bound on adjusted demand (UB), and a current upper demand ($UB_0$); receive one or more measurements of a state of the electrical system; repeatedly compare an adjusted net power to the $UB_0$ and the UB and set an energy storage system command control variable (ESS command) based on a state of the adjusted net power, the $UB_0$, and the UB, wherein: if adding the $P_{nom}$ to the adjusted net power does not violate the UB and the $UB_0$, a first condition is met and the ESS command is set to the nominal power; if adding the $P_{nom}$ to the adjusted net power violates the UB, a second condition is met and the ESS command is set to be a discharge command such that the upper bound is reached; if the $P_{nom}$ is a charge command, and if adding $P_{nom}$ to the adjusted net power violates the $UB_0$, a third condition is met and the ESS command is set to be an altered charge command such that the $UB_0$ is reached; and if the first condition, the second condition, or the third condition are not met, and if adding the $P_{nom}$ to the adjusted net power would result in a value higher than the $UB_0$ but lower than the UB, a fourth condition is met and the ESS command is set to zero; and provide the ESS command to the electrical system, via the communication interface, to effectuate a change to one or more components of the electrical system.

Example 2

The controller of Example 1, wherein the set of control parameters further includes a lower bound (LB) and the one or more processors are further to set the ESS command further based on the LB, wherein: if adding the Pnom to adjusted net power violates the lower bound, a fifth condition is met and the ESS command is set to a second altered charge command such that the lower bound is reached.

Example 3

The controller of Example 1, wherein the $UB_0$ is not to be actively exceeded.

Example 4

The controller of Example 1, wherein the $UB_0$ specifies a constraint value that a sum of the adjusted net power and ESS command is not to exceed when the $P_{nom}$ is the charge command if the adjusted net power does not exceed the $UB_0$.

Example 5

The controller of Example 1, wherein the $UB_0$ represents a historical maximum adjusted net power measured during a demand period.

Example 6

The controller of Example 1, wherein the ESS command is limited by an inverter capability.

Example 7

The controller of Example 1, wherein the one or more processors are further to increase $UB_0$ to a maximum adjusted net power during a demand period when the adjusted net power exceeds $UB_0$.

Example 8

A controller to control an electrical system, the controller comprising: a communication interface to provide a communication path with an electrical system; and one or more processors to receive a set of control parameters for a segment of an upcoming extended time period, the set of control parameters including a nominal energy storage system power ($P_{nom}$), an upper bound on adjusted demand (UB), and a current upper demand ($UB_0$); receive one or more measurements of a state of the electrical system; set an energy storage system command control variable (ESS command) initially to the $P_{nom}$; the one or more processors to repeatedly: calculate an adjusted net power by summing an unadjusted net power of the electrical system and the ESS command; compare the adjusted net power to the $UB_0$ and the UB; set the ESS command based on the comparison of the adjusted net power to the $UB_0$ and the UB, wherein: when the adjusted net power is less than or equal to the $UB_0$, the ESS command is set to $P_{nom}$; when the adjusted net power is greater than the $UB_0$ and less than the UB and the $P_{nom}$ is positive: if the $UB_0$ minus the unadjusted net power is positive, the ESS command is set to the $UB_0$ minus the unadjusted net power; and if the $UB_0$ minus the unadjusted net power is negative, the ESS command is set to a value to stop an ESS from charging; when the adjusted net power is greater than the $UB_0$ and less than the UB and the ESS command is negative, the ESS command is set to $P_{nom}$; and when the adjusted net power is greater than or equal to UB, the ESS command is set to UB minus the unadjusted net power; and provide the ESS command to the electrical system, via the communication interface, to effectuate a change to one or more components of the electrical system.

Example 9

The controller of Example 8, wherein the set of control parameters further includes a lower bound (LB) and the one or more processors are further to: compare the adjusted net power to the LB; and when the adjusted net power is less than the LB, set the ESS command to LB minus the unadjusted net power.

Example 10

The controller of Example 8, wherein the $UB_0$ is not to be actively exceeded.

Example 11

The controller of Example 8, wherein the $UB_0$ specifies a constraint value that the adjusted net power is not to exceed when the $P_{nom}$ is the charge command when the adjusted net power does not exceed the $UB_0$.

Example 12

The controller of Example 8, wherein the $UB_0$ represents a historical maximum adjusted net power measured during a demand period.

Example 13

The controller of Example 8, wherein the one or more processors are further to increase the $UB_0$ to a maximum adjusted net power during a demand period when the adjusted net power exceeds the $UB_0$.

Example 14

A controller to control an electrical system, the controller comprising: a communication interface to provide a communication path with an electrical system; and one or more processors to: receive a set of control parameters for a segment of an upcoming extended time period, the control parameters including a nominal energy storage system power ($P_{nom}$), an upper bound on adjusted demand (UB), and a current upper demand ($UB_0$); the one or more processors to repeatedly: compare an adjusted net power to the $UB_0$ and the UB; set an energy storage system command control variable (ESS command) based on the comparison of the adjusted net power to the $UB_0$ and the UB, wherein when the $P_{nom}$ is positive the ESS command is: set to $P_{nom}$ when the adjusted net power is less than $UB_0$; set to a first value that maintains the adjusted net power at $UB_0$ when the adjusted net power is greater than $UB_0$ and $UB_0$ minus the unadjusted net power is positive; set to a second value that is non-positive when the adjusted net power is greater than $UB_0$ and $UB_0$ minus the unadjusted net power is negative; and set to a third value to maintain the adjusted net power at or below the UB if the adjusted net power with a current ESS command will exceed the UB; and provide the ESS command to the electrical system, via the communication interface, to effectuate a change to one or more components of the electrical system.

Example 15

The controller of Example 14, wherein when $P_{nom}$ is negative the ESS command is: set to $P_{nom}$ when the adjusted net power is less than the UB; and set to a value to maintain the adjusted net power below the UB if the adjusted net power with the current ESS command will exceed the UB.

Example 16

The controller of Example 14, wherein the set of control parameters further includes a lower bound (LB) and the one or more processors are further to: compare the unadjusted net power to the LB; and set the ESS command to a fourth value to maintain an adjusted net power above the LB when unadjusted net power is below LB.

Example 17

The controller of Example 14, wherein the $UB_0$ is not to be actively exceeded.

Example 18

The controller of Example 14, wherein the $UB_0$ specifies a constraint value that the adjusted net power is not to exceed when $P_{nom}$ is the charge command when the adjusted net power does not exceed $UB_0$.

Example 19

The controller of Example 14, wherein the $UB_0$ represents a historical maximum adjusted net power measured during a demand period.

Example 20

The controller of Example 14, wherein the one or more processors are further to increase the $UB_0$ to a maximum adjusted net power during a demand period when the adjusted net power exceeds the $UB_0$.

The described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

The foregoing specification has been described with reference to various embodiments, including the best mode. However, those skilled in the art appreciate that various modifications and changes can be made without departing from the scope of the present disclosure and the underlying principles of the invention. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection.

Principles of the present disclosure may be reflected in a computer program product on a tangible computer-readable storage medium having computer-readable program code means embodied in the storage medium. Any suitable computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a computer-readable memory that can direct a computer or other programmable data processing apparatus to function in a particular manner, such that the instructions stored in the computer-readable memory produce an article of manufacture including instruction means which implement the function specified. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified.

Principles of the present disclosure may be reflected in a computer program implemented as one or more software modules or components. As used herein, a software module or component (e.g., engine, system, subsystem) may include any type of computer instruction or computer-executable code located within a memory device and/or computer-readable storage medium. A software module may, for instance, comprise one or more physical or logical blocks of computer instructions, which may be organized as a routine, a program, an object, a component, a data structure, etc., that perform one or more tasks or implement particular data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools.

Embodiments as disclosed herein may be computer-implemented in whole or in part on a digital computer. The digital computer includes a processor performing the required computations. The computer further includes a memory in electronic communication with the processor to store a computer operating system. The computer operating systems may include, but are not limited to, MS-DOS, Windows, Linux, Unix, AIX, CLIX, QNX, OS/2, and Apple. Alternatively, it is expected that future embodiments will be adapted to execute on other future operating systems.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

While the principles of this disclosure have been shown in various embodiments, many modifications of structure, arrangements, proportions, the elements, materials and components, used in practice, which are particularly adapted for a specific environment and operating requirements, may be used without departing from the principles and scope of this disclosure. These and other changes or modifications are intended to be included within the scope of the present disclosure.

The scope of the present invention should, therefore, be determined only by the following claims.

The invention claimed is:

1. A controller to control an electrical system, the controller comprising:
    a communication interface to provide a communication path with an electrical system; and
    one or more processors to:
        receive a set of control parameters for a segment of an upcoming extended time period, the set of control parameters including a nominal energy storage system power ($P_{nom}$), an upper bound on adjusted demand (UB), and a current upper demand ($UB_0$);
        receive one or more measurements of a state of the electrical system;
        repeatedly compare an adjusted net power to the $UB_0$ and the UB and set an energy storage system command control variable (ESS command) based on a state of the adjusted net power, the $UB_0$, and the UB, wherein:
            if adding the $P_{nom}$ to the adjusted net power does not violate the UB and the $UB_0$, a first condition is met and the ESS command is set to the nominal power;
            if adding the $P_{nom}$ to the adjusted net power violates the UB, a second condition is met and the ESS command is set to be a discharge command such that the upper bound is reached;
            if the $P_{nom}$ is a charge command, and if adding $P_{nom}$ to the adjusted net power violates the $UB_0$, a third condition is met and the ESS command is set to be an altered charge command such that the $UB_0$ is reached; and
            if the first condition, the second condition, or the third condition are not met, and if adding the $P_{nom}$ to the adjusted net power would result in a value higher than the $UB_0$ but lower than the UB, a fourth condition is met and the ESS command is set to zero; and
        provide the ESS command to the electrical system, via the communication interface, to effectuate a change to one or more components of the electrical system.

2. The controller of claim 1, wherein the set of control parameters further includes a lower bound (LB) and the one or more processors are further to set the ESS command further based on the LB, wherein:
    if adding the Pnom to adjusted net power violates the lower bound, a fifth condition is met and the ESS command is set to a second altered charge command such that the lower bound is reached.

3. The controller of claim 1, wherein the $UB_0$ is not to be actively exceeded.

4. The controller of claim 1, wherein the $UB_0$ specifies a constraint value that a sum of the adjusted net power and ESS command is not to exceed when the $P_{nom}$ is the charge command if the adjusted net power does not exceed the $UB_0$.

5. The controller of claim 1, wherein the $UB_0$ represents a historical maximum adjusted net power measured during a demand period.

6. The controller of claim 1, wherein the ESS command is limited by an inverter capability.

7. The controller of claim 1, wherein the one or more processors are further to increase $UB_0$ to a maximum adjusted net power during a demand period when the adjusted net power exceeds $UB_0$.

8. A controller to control an electrical system, the controller comprising:
   a communication interface to provide a communication path with an electrical system; and
   one or more processors to
      receive a set of control parameters for a segment of an upcoming extended time period, the set of control parameters including a nominal energy storage system power ($P_{nom}$), an upper bound on adjusted demand (UB), and a current upper demand ($UB_0$);
      receive one or more measurements of a state of the electrical system;
      set an energy storage system command control variable (ESS command) initially to the $P_{nom}$;
   the one or more processors to repeatedly:
      calculate an adjusted net power by summing an unadjusted net power of the electrical system and the ESS command;
      compare the adjusted net power to the $UB_0$ and the UB;
      set the ESS command based on the comparison of the adjusted net power to the $UB_0$ and the UB, wherein:
         when the adjusted net power is less than or equal to the $UB_0$, the ESS command is set to $P_{nom}$;
         when the adjusted net power is greater than the $UB_0$ and less than the UB and the $P_{nom}$ is positive:
            if the $UB_0$ minus the unadjusted net power is positive, the ESS command is set to the $UB_0$ minus the unadjusted net power; and
            if the $UB_0$ minus the unadjusted net power is negative, the ESS command is set to a value to stop an ESS from charging;
         when the adjusted net power is greater than the $UB_0$ and less than the UB and the ESS command is negative, the ESS command is set to $P_{nom}$; and
         when the adjusted net power is greater than or equal to UB, the ESS command is set to UB minus the unadjusted net power; and
      provide the ESS command to the electrical system, via the communication interface, to effectuate a change to one or more components of the electrical system.

9. The controller of claim 8, wherein the set of control parameters further includes a lower bound (LB) and the one or more processors are further to:
   compare the adjusted net power to the LB; and
   when the adjusted net power is less than the LB, set the ESS command to LB minus the unadjusted net power.

10. The controller of claim 8, wherein the $UB_0$ is not to be actively exceeded.

11. The controller of claim 8, wherein the $UB_0$ specifies a constraint value that the adjusted net power is not to exceed when the $P_{nom}$ is the charge command when the adjusted net power does not exceed the $UB_0$.

12. The controller of claim 8, wherein the $UB_0$ represents a historical maximum adjusted net power measured during a demand period.

13. The controller of claim 8, wherein the one or more processors are further to increase the $UB_0$ to a maximum adjusted net power during a demand period when the adjusted net power exceeds the $UB_0$.

14. A controller to control an electrical system, the controller comprising:
   a communication interface to provide a communication path with an electrical system; and
   one or more processors to:
      receive a set of control parameters for a segment of an upcoming extended time period, the control parameters including a nominal energy storage system power ($P_{nom}$), an upper bound on adjusted demand (UB), and a current upper demand ($UB_0$);
   the one or more processors to repeatedly:
      compare an adjusted net power to the $UB_0$ and the UB;
      set an energy storage system command control variable (ESS command) based on the comparison of the adjusted net power to the $UB_0$ and the UB, wherein when the $P_{nom}$ is positive the ESS command is:
         set to $P_{nom}$ when the adjusted net power is less than $UB_0$;
         set to a first value that maintains the adjusted net power at $UB_0$ when the adjusted net power is greater than $UB_0$ and $UB_0$ minus the unadjusted net power is positive;
         set to a second value that is non-positive when the adjusted net power is greater than $UB_0$ and $UB_0$ minus the unadjusted net power is negative; and
         set to a third value to maintain the adjusted net power at or below the UB if the adjusted net power with a current ESS command will exceed the UB; and
      provide the ESS command to the electrical system, via the communication interface, to effectuate a change to one or more components of the electrical system.

15. The controller of claim 14, wherein when $P_{nom}$ is negative the ESS command is:
   set to $P_{nom}$ when the adjusted net power is less than the UB; and
   set to a value to maintain the adjusted net power below the UB if the adjusted net power with the current ESS command will exceed the UB.

16. The controller of claim 14, wherein the set of control parameters further includes a lower bound (LB) and the one or more processors are further to:
   compare the unadjusted net power to the LB; and
   set the ESS command to a fourth value to maintain an adjusted net power above the LB when unadjusted net power is below LB.

17. The controller of claim 14, wherein the $UB_0$ is not to be actively exceeded.

18. The controller of claim 14, wherein the $UB_0$ specifies a constraint value that the adjusted net power is not to exceed when $P_{nom}$ is the charge command when the adjusted net power does not exceed $UB_0$.

19. The controller of claim 14, wherein the $UB_0$ represents a historical maximum adjusted net power measured during a demand period.

20. The controller of claim 14, wherein the one or more processors are further to increase the $UB_0$ to a maximum adjusted net power during a demand period when the adjusted net power exceeds the $UB_0$.

* * * * *